US012655261B2

(12) United States Patent
Kaneta et al.

(10) Patent No.: US 12,655,261 B2
(45) Date of Patent: Jun. 16, 2026

(54) SIZING AGENT, SIZING AGENT-ADHERED CARBON FIBERS AND METHOD FOR PRODUCING SAME, AQUEOUS DISPERSION OF SIZING AGENT, PREPREG AND METHOD FOR PRODUCING SAME, AND METHOD FOR PRODUCING CARBON FIBER-REINFORCED COMPOSITE MATERIAL

(71) Applicant: Mitsubishi Chemical Corporation, Tokyo (JP)

(72) Inventors: Kenji Kaneta, Tokyo (JP); Naoki Sugiura, Tokyo (JP); Kouki Wakabayashi, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 1395 days.

(21) Appl. No.: 17/304,474

(22) Filed: Jun. 22, 2021

(65) Prior Publication Data

US 2021/0309820 A1 Oct. 7, 2021

Related U.S. Application Data

(63) Continuation of application No. PCT/JP2019/050757, filed on Dec. 25, 2019.

(30) Foreign Application Priority Data

Dec. 25, 2018 (JP) ................................ 2018-241225

(51) Int. Cl.

| | |
|---|---|
| ***C08J 5/24*** | (2006.01) |
| ***B29B 11/16*** | (2006.01) |
| ***B29C 70/42*** | (2006.01) |
| ***B29K 71/00*** | (2006.01) |
| ***C08J 5/12*** | (2006.01) |
| ***C08J 5/18*** | (2006.01) |
| *B29K 105/08* | (2006.01) |
| *B29K 307/04* | (2006.01) |

(52) U.S. Cl.

CPC ............... *C08J 5/248* (2021.05); *B29B 11/16* (2013.01); *B29C 70/42* (2013.01); *C08J 5/121* (2013.01); *C08J 5/18* (2013.01); *C08J 5/243* (2021.05); *B29K 2071/00* (2013.01); *B29K 2105/0872* (2013.01); *B29K 2307/04* (2013.01); *C08J 2371/08* (2013.01)

(58) Field of Classification Search

CPC ..... C08J 5/248; C08J 5/121; C08J 5/18; C08J 5/243; C08J 2371/08; C08J 2363/00; C08J 2371/02; C08J 2463/00; C08J 2471/02; C08J 5/10; B29B 11/16; B29C 70/42; B29K 2071/00; B29K 2105/0872; B29K 2307/04; D06M 13/152; D06M 13/165; D06M 2101/40; D06M 2200/40; D06M 15/55; D06M 15/53

See application file for complete search history.

(56) References Cited

U.S. PATENT DOCUMENTS

| | | | | |
|---|---|---|---|---|
| 4,751,258 | A * | 6/1988 | Minami | D01F 11/14 523/426 |
| 5,910,456 | A | 6/1999 | Matsuhisa et al. | |
| 2013/0122262 | A1 * | 5/2013 | Nagakura | B29C 70/345 442/179 |
| 2015/0361591 | A1 | 12/2015 | Watanabe et al. | |
| 2016/0369071 | A1 | 12/2016 | Ohtani et al. | |
| 2018/0044851 | A1 | 2/2018 | Ueda et al. | |

FOREIGN PATENT DOCUMENTS

| | | | |
|---|---|---|---|
| CN | 104649702 | A | 5/2015 |
| CN | 106029975 | A | 10/2016 |
| JP | 57-171767 | A | 10/1982 |
| JP | 02-307978 | A | 12/1990 |
| JP | 2012-167250 | A | 9/2012 |
| JP | 2012-214925 | A | 11/2012 |
| JP | 2013-173812 | A | 9/2013 |
| JP | 2013-177704 | A | 9/2013 |
| JP | 2014-139360 | A | 7/2014 |
| JP | 2016-160540 | A | 9/2016 |
| KR | 10-2015-0095958 | A | 8/2015 |
| WO | WO 96/21695 | A1 | 7/1996 |
| WO | WO 2010/091135 | A1 | 8/2010 |
| WO | WO 2014/115762 | A1 | 7/2014 |
| WO | WO 2015/133569 | A1 | 9/2015 |

OTHER PUBLICATIONS

International Search Report issued Mar. 17, 2020 in PCT/JP2019/050757 filed on Dec. 25, 2019, 10 pages (with English Translation).
Japanese Office Action issued Mar. 2, 2021 in Japanese Patent Application No. 2020-504037, 10 pages (with English Machine Translation).
Taiwanese Office Action issued Nov. 26, 2020 in Taiwanese Patent Application No. 108147460, 47 pages (with English Machine Translation).
European Office Action issued Nov. 15, 2024, in Japanese European Patent Application No. 19902322.7, 8 pages.

(Continued)

*Primary Examiner* — Elizabeth M Imani
(74) *Attorney, Agent, or Firm* — Oblon, McClelland, Maier & Neustadt, L.L.P.

(57) ABSTRACT

Use of a sizing agent having a heat weight loss B-1 of 65% or more as determined by a specific measurement method, or a sizing agent containing a surfactant and a compound represented by formula (1):

(1)

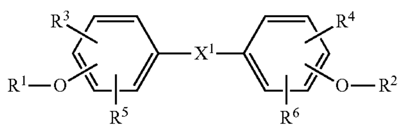

24 Claims, No Drawings

(56) References Cited

OTHER PUBLICATIONS

Chinese Office Action issued Jan. 4, 2024 in Chinese Patent Application No. 201980085385.7 (with English translation, 29 pages.
Japanese Office Action issued Jan. 23, 2024 in Japanese Patent Application No. 2022-118088 (with English machine translation), 10 pages.
Office Action issued Nov. 21, 2022, in corresponding Korean Patent Application No. 10-2021-7019294 (with English Translation), 29 pages.
Combined Chinese Office Action and Search Report issued Dec. 6, 2022, in corresponding Chinese Patent Application No. 201980085385.7 (with English Translation) 23 pages.
Extended European Search Report issued Jan. 4, 2022 in European Patent Application No. 19902322.7, 5 pages.
Office Action issued Jun. 27, 2023, in corresponding Chinese Patent Application No. 201980085385.7 (with English Translation), 16 pages.
Office Action issued Jul. 31, 2023, in corresponding Korean Patent Application No. 10-2021-7019294 (with English Translation), 18 pages.

* cited by examiner

SIZING AGENT, SIZING AGENT-ADHERED CARBON FIBERS AND METHOD FOR PRODUCING SAME, AQUEOUS DISPERSION OF SIZING AGENT, PREPREG AND METHOD FOR PRODUCING SAME, AND METHOD FOR PRODUCING CARBON FIBER-REINFORCED COMPOSITE MATERIAL

This application is a continuation application of International Application No. PCT/JP2019/050757, filed on Dec. 25, 2019, which claims priority to Japanese Patent Application No. 2018-241225, filed Dec. 25, 2018, the contents of which are incorporated herein by reference.

TECHNICAL FIELD

The present invention relates to a sizing agent, sizing agent-adhered carbon fibers and a method for producing the same, a sizing agent aqueous dispersion, a prepreg and a method for producing the same, and a method for producing a carbon fiber-reinforced composite material.

BACKGROUND ART

Carbon fibers have excellent specific strength and specific elastic modulus, and carbon fiber-reinforced composite materials combined with various matrix resins are widely used in various applications such as aviation, aerospace, sports, and leisure use. Especially, carbon fiber-reinforced composite materials using, as matrix resins, highly heat-resistant thermoplastic resins called super engineering plastics, such as poly(phenylene sulfide), polyetheretherketone (PEEK), polyetherketoneketone (PEKK), and polyetherimide, have recently been attracting attention because such composite materials possess high heat resistance and mechanical properties.

As a method for producing a carbon fiber-reinforced composite material, there is a method using an intermediate material called "a prepreg," in which carbon fibers are impregnated with a matrix resin.

Since carbon fibers have low elongation and are brittle, carbon fibers are likely to suffer fluffing due to mechanical friction or the like. Therefore, a sizing agent is applied to the carbon fibers to form sizing agent-adhered carbon fibers, so as to improve the handling properties for processing.

Super engineering plastics require a higher molding temperature than general-purpose thermoplastic resins such as polypropylene, and are hard to impregnate without leaving voids. Therefore, the sizing agent-adhered carbon fibers used in the carbon fiber-reinforced composite materials using super engineering plastics as matrix resins are required to have high spreadability.

Patent Document 1 discloses a method for sizing carbon fibers using a sizing agent containing a solid bisphenol A type epoxy resin.

Patent Document 2 discloses fibers coated with amorphous PEKK.

DESCRIPTION OF PRIOR ART

Patent Document

Patent Document 1: Japanese Unexamined Patent Application, First Publication JP 1982-171767A Patent Document 2: International Patent Application Publication WO2010/091135

DISCLOSURE OF INVENTION

Problems to be Solved by the Invention

However, the spreadability of the sizing agent-adhered carbon fibers described in Patent Document 1 was insufficient. Further, in case a carbon fiber-reinforced composite material is formed from a prepreg in which the above-mentioned sizing agent-adhered carbon fibers are impregnated with a matrix resin requiring a high molding temperature such as super engineering plastics, voids are found in some cases in the resulting molded product (carbon fiber-reinforced composite material). The voids are presumed to be the gas generated by the decomposition or volatilization of the sizing agent and trapped during the process where the matrix resin, which is melted and fluidized by being heated to a high temperature, proceeds to fill the gaps between the carbon fibers.

By reducing the amount of the sizing agent adhered to the carbon fibers, the spreadability improves. In this case, since the amount of gas generated by the decomposition or volatilization of the sizing agent heated to a high temperature during the molding to form the carbon fiber-reinforced composite material from a prepreg can be reduced, the void inside the molded product can be suppressed as well. However, the reduction of amount of the sizing agent adhered to the carbon fibers poses a problem that the handling properties of the carbon fibers significantly deteriorates.

In the case of the fibers coated with the amorphous PEKK described in Patent Document 2, since the PEKK has extremely high heat resistance, the sizing agent is not easily heat-decomposed during molding carbon fiber-reinforced composites from the prepreg, and voids can be reduced.

However, the carbon fibers coated with the amorphous PEKK have extremely low spreadability, which, in some cases, makes it difficult to impregnate the carbon fibers with matrix resins.

The object of the present invention is to provide a sizing agent that can be used to obtain sizing agent-adhered carbon fibers showing excellent performance in respect of fiber spreading and handling, and suitable for producing a prepreg that can be used to obtain a carbon fiber-reinforced composite material having a highly heat-resistant thermoplastic resin as a matrix resin and having extremely small amount of voids, as well as sizing agent-adhered carbon fibers containing the sizing agent, an aqueous dispersion containing the sizing agent, a method for producing sizing agent-adhered carbon fibers using the sizing agent, a method for producing a prepreg using the sizing agent-adhered carbon fibers containing the sizing agent, and a method for producing a carbon fiber-reinforced composite material.

Means to Solve the Problems

The embodiments of the present invention are as follows.

[1] A sizing agent having a heat weight loss B-1 of 65% or more as determined by a measurement method defined below, wherein the measurement method for the heat weight loss B-1 includes: taking $W_10$ (mg) of the sizing agent in a range of 10±2 mg; heating the sizing agent from 100° C. at a rate of 5° C./min in a nitrogen stream of 200 ml (in terms of a volume at 1 atm and 25° C.)/min, using a thermogravimetric analyzer;

reading the mass of the sizing agent having reached 350° C. as $W_12$ (mg); and calculating the heat weight loss B-1 by formula (i):

$$\text{heat weight loss } B\text{-}1(\%)=\{(W_10-W_12)/W_10\}\times 100 \quad \text{(i).}$$

[2] The sizing agent according to [1], which has a heat weight loss A-1 of 10% or less as determined by a measurement method defined below, wherein the measurement method for the heat weight loss A-1 includes: taking $W_10$ (mg) of the sizing agent in a range of 10±2 mg; heating the sizing agent from 100° C. at a rate of 5° C./min in a nitrogen stream of 200 ml (in terms of a volume at 1 atm and 25° C.)/min, using a thermogravimetric analyzer; reading the mass of the sizing agent having reached 250° C. as $W_11$ (mg); and calculating the heat weight loss A-1 by formula (ii):

$$\text{heat weight loss } A\text{-}1(\%)=\{(W_10-W_11)/W_10\}\times 100 \quad \text{(ii).}$$

[3] The sizing agent according to [1] or [2], which further contains a surfactant.

[4] The sizing agent according to [3], wherein the surfactant has a heat weight loss B-4 of 10% or more as determined by a measurement method defined below, wherein the measurement method for the heat weight loss B-4 includes: taking $W_40$ (mg) of the surfactant in a range of 10±2 mg; heating the surfactant from 100° C. at a rate of 5° C./min in a nitrogen stream of 200 ml (in terms of a volume at 1 atm and 25° C.)/min, using a thermogravimetric analyzer; reading the mass of the surfactant having reached 350° C. as $W_42$ (mg); and calculating the heat weight loss B-4 by formula (iii):

$$\text{heat weight loss } B\text{-}4(\%)=\{(W_40-W_42)/W_40\}\times 100 \quad \text{(iii).}$$

[5] The sizing agent according to [3] or [4], wherein an amount of the surfactant is 5 to 25% by mass, based on a total mass of the sizing agent.

[6]A sizing agent containing a surfactant and a compound (1) represented by formula (I):

(1)

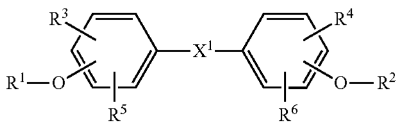

wherein $X^1$ is a direct bond or a binding group represented by formula (1'), $R^1$ and $R^2$ arc each independently a hydrogen atom or a substituent having 1 to 7 carbon atoms, and $R^3$, $R^4$, $R^5$ and $R^6$ are each independently a hydrogen atom or a hydrocarbon group having 1 to 3 carbon atoms:

(1')

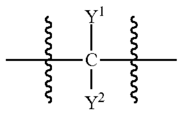

wherein $Y^1$ and $Y^2$ are each independently a hydrogen atom or a hydrocarbon group having 1 to 3 carbon atoms, and each wavy line indicates a bonding site with an adjacent group.

[7] The sizing agent according to [6], wherein an amount of the compound (1) is 50% by mass or more, based on a total mass of the sizing agent.

[8] The sizing agent according to [6] or [7], wherein the compound (1) includes a compound (2) represented by formula (2) and a compound (3) represented by formula (3):

(2)

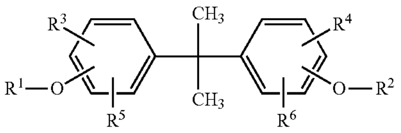

wherein $R^1$ and $R^2$ are each independently a hydrogen atom or a substituent having 1 to 7 carbon atoms, and $R^3$, $R^4$, $R^5$ and $R^6$ are each independently a hydrogen atom or a hydrocarbon group having 1 to 3 carbon atoms:

(3)

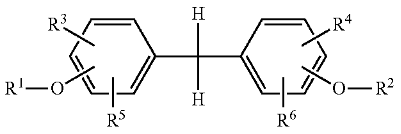

wherein $R^1$ and $R^2$ are each independently a hydrogen atom or a substituent having 1 to 7 carbon atoms, and $R^3$, $R^4$, $R^5$ and $R^6$ are each independently a hydrogen atom or a hydrocarbon group having 1 to 3 carbon atoms.

[9] The sizing agent according to [8], wherein an amount of the compound (3) contained in the sizing agent is 10 to 100 parts by mass, relative to 100 parts by mass of the compound (2).

[10] The sizing agent according to [8] or [9], wherein a sum of amounts of the compound (2) and the compound (3) contained in the sizing agent is 50% by mass or more, based on a total mass of the sizing agent.

[11] The sizing agent according to any one of [6] to [10], wherein an amount of the surfactant is 5 to 25% by mass, based on a total mass of the sizing agent.

[12] Sizing agent-adhered carbon fibers, in which a sizing agent adheres to carbon fibers, wherein a heat weight loss B-2 is 65% or more as determined by a measurement method defined below with respect to an extract extracted from the sizing agent-adhered carbon fibers by an extraction operation defined below, wherein the extraction operation includes: a step of immersing 100 parts by mass of the sizing agent-adhered carbon fibers in 2000 parts by mass of methyl ethyl ketone, followed by performing ultrasonic cleaning at 30° C. for 30 minutes; a step of separating the carbon fibers from an extraction liquid obtained by ultrasonic cleaning by a filtration operation; repeating operations of said steps three times with respect to the separated carbon fibers; and mixing the extraction liquids obtained in respective filtration operations and depressurized to distill off the methyl ethyl ketone to obtain an extract, wherein the measurement method for the heat weight loss B-2 includes: taking $W_20$ (mg) of the extract in a range of 10±2 mg; heating the extract from 100° C. at a rate of 5° C./min in a nitrogen stream of 200 ml (in terms of a volume at 1 atm and 25° C.)/min, using a thermogravimetric analyzer; reading the mass of the extract having reached 350° C. as $W_2 2$ (mg); and calculating the heat weight loss B-2 by formula (iv):

$$\text{heat weight loss } B\text{-}2(\%)=\{(W_2 0-W_2 2)/W_2 0\}\times 100 \quad \text{(iv)}.$$

[13] The sizing agent-adhered carbon fibers according to [12], wherein the extract has a heat weight loss A-2 of 10% or less as determined by a measurement method defined below, wherein the measurement method for the heat weight loss A-2 includes: taking $W_2 0$ (mg) of the extract in a range of 10±2 mg; heating the extract from 100° C. at a rate of 5° C./min in a nitrogen stream of 200 ml (in terms of a volume at 1 atm and 25° C.)/min, using a thermogravimetric analyzer; reading the mass of the extract having reached 250° C. as $W_2 1$ (mg); and calculating the heat weight loss A-2 by formula (v):

$$\text{heat weight loss } A\text{-}2(\%)=\{(W_2 0-W_2 1)/W_2 0\}\times 100 \quad \text{(v)}.$$

[14] The sizing agent-adhered carbon fibers according to [12] or [13], which further contains a surfactant.

[15] The sizing agent-adhered carbon fibers according to [14], wherein the surfactant has a heat weight loss B-4 of 10% or more as determined by a measurement method defined below, wherein the measurement method for the heat weight loss B-4 includes: taking $W_4 0$ (mg) of the surfactant in a range of 10±2 mg; heating the surfactant from 100° C. at a rate of 5° C./min in a nitrogen stream of 200 ml (in terms of a volume at 1 atm and 25° C.)/min, using a thermogravimetric analyzer; reading the mass of the surfactant having reached 350° C. as $W_4 2$ (mg); and calculating the heat weight loss B-4 by formula (iii):

$$\text{heat weight loss } B\text{-}4(\%)=\{(W_4 0-W_4 2)/W_4 0\}\times 100 \quad \text{(iii)}.$$

[16] The sizing agent-adhered carbon fibers according to [14] or [15], wherein an amount of the surfactant is 0.001 to 0.5% by mass, based on a sum of a mass of the sizing agent and a mass of the carbon fibers.

[17] The sizing agent-adhered carbon fibers according to any one of [12] to [16], wherein an amount of the adhered sizing agent is 0.1 to 5% by mass, based on a sum of a mass of the sizing agent and a mass of the carbon fibers.

[18] A sizing agent aqueous dispersion, which includes a sizing agent and water, and has a heat weight loss B-3 of 65% or more as determined by a measurement method defined below, wherein the measurement method for the heat weight loss B-3 includes: weighting 1 g of the sizing agent aqueous dispersion, followed by heating at 110° C. for 1 hour to remove water to recover the sizing agent; taking $W_3 0$ (mg) of the sizing agent in a range of 10±2 mg; heating the sizing agent from 100° C. at a rate of 5° C./min in a nitrogen stream of 200 ml (in terms of a volume at 1 atm and 25° C.)/min, using a thermogravimetric analyzer; reading the mass of the sizing agent having reached 350° C. as $W_3 2$ (mg); and calculating the heat weight loss B-3 by formula (vi):

$$\text{heat weight loss } B\text{-}3(\%)=\{(W_3 0-W_3 2)/W_3 0\}\times 100 \quad \text{(vi)}.$$

[19] The sizing agent aqueous dispersion according to [18], which has a heat weight loss A-3 of 10% or less as determined by a measurement method defined below, wherein the measurement method for the heat weight loss A-3 includes: weighting 1 g of the sizing agent aqueous dispersion, followed by heating at 110° C. for 1 hour to remove water to recover the sizing agent; taking $W_3 0$ (mg) of the sizing agent in a range of 10±2 mg; heating the sizing agent from 100° C. at a rate of 5° C./min in a nitrogen stream of 200 ml (in terms of a volume at 1 atm and 25° C.)/min, using a thermogravimetric analyzer; reading the mass of the sizing agent having reached 250° C. as $W_3 1$ (mg); and calculating the heat weight loss A-3 by formula (vii):

$$\text{heat weight loss } A\text{-}3(\%)=\{(W_3 0-W_3 1)/W_3 0\}\times 100 \quad \text{(vii)}.$$

[20] The sizing agent aqueous dispersion according to [18] or [19], wherein the sizing agent contains a surfactant.

[21] The sizing agent aqueous dispersion according to [20], wherein the surfactant has a heat weight loss B-4 of 10% or more as determined by a measurement method defined below, wherein the measurement method for the heat weight loss B-4 includes: taking $W_4 0$ (mg) of the surfactant in a range of 10±2 mg; heating the surfactant from 100° C. at a rate of 5° C./min in a nitrogen stream of 200 ml (in terms of a volume at 1 atm and 25° C.)/min, using a thermogravimetric analyzer; reading the mass of the surfactant having reached 350° C. as $W_4 2$ (mg); and calculating the heat weight loss B-4 by formula (iii):

$$\text{heat weight loss } B\text{-}4(\%)=\{(W_4 0-W_4 2)/W_4 0\}\times 100 \quad \text{(iii)}.$$

[22] The sizing agent aqueous dispersion according to [20] or [21], wherein an amount of the surfactant contained in the sizing agent is 5 to 25% by mass, based on a total mass of the sizing agent.

[23] A method for producing sizing agent-adhered carbon fibers, including applying the sizing agent aqueous dispersion of any one of [18] to [22] to carbon fibers, and removing water therefrom to make the sizing agent adhere to the carbon fibers.

[24] The method according to [23], wherein the sizing agent aqueous dispersion is applied to the carbon fibers by immersing the carbon fibers in the sizing agent aqueous dispersion.

[25] A prepreg containing the sizing agent of any one of [1] to [11], carbon fibers, and a matrix resin, wherein:

the matrix resin is a thermoplastic resin, and a glass transition temperature of the thermoplastic resin is 50° C. or higher.

[26] The prepreg according to [25], wherein the thermoplastic resin includes one or more selected from the group consisting of polyimide, polyamideimide, polyetherimide, polyetherketone, polyetherketoneketone, polyetheretherketone, polyphenylene sulfide and polyethersulfone.

[27] A method for producing a prepreg, including impregnating the sizing agent-adhered carbon fibers of any one of [12] to [17] with a matrix resin.

[28] The method according to [27], wherein the sizing agent-adhered carbon fibers are impregnated with the matrix resin by heating the matrix resin to 100 to 400° C.

[29]A method for producing a carbon fiber-reinforced composite material, including producing a prepreg by the method of [27] or [28], laminating two or more sheets of the obtained prepreg to obtain a laminate, and heating the laminate to 350° C. or higher to mold the laminate.

Effect of the Invention

The present invention can provide a carbon fiber-reinforced composite material with extremely small amount of voids, using a highly heat-resistant thermoplastic resin as a matrix resin.

The use of the prepreg of the present invention enables easy production of a carbon fiber-reinforced composite material with extremely small amount of voids, using a highly heat-resistant thermoplastic resin as a matrix resin.

The method of the present invention for producing a prepreg enables easy production of a prepreg that can provide a carbon fiber-reinforced composite material with extremely small amount of voids, having a highly heat-resistant thermoplastic resin as a matrix resin.

The sizing agent-adhered carbon fibers of the present invention show excellent performance in respect of fiber spreading and handling, and are suitable for producing the prepreg.

The method of the present invention for producing sizing agent-adhered carbon fibers enables easy production of sizing agent-adhered carbon fibers which show excellent performance in respect of fiber spreading and handling, and are suitable for producing the prepreg.

The use of the sizing agent aqueous dispersion of the present invention enables easy production of the sizing agent-adhered carbon fibers.

The use of the sizing agent of the present invention enables easy production of the sizing agent aqueous dispersion and the sizing agent-adhered carbon fibers.

DESCRIPTION OF THE EMBODIMENTS

[Sizing Agent]

The sizing agent of the first or second embodiment of the present invention is useful particularly as a sizing agent for carbon fibers.

In the context of the present specification, the carbon fibers before applying the sizing agent thereto are also referred to as "untreated carbon fibers". Further, the carbon fibers to which the sizing agent is adhered are referred to as "sizing agent-adhered carbon fibers".

First Embodiment

The sizing agent of the first embodiment of the present invention has a heat weight loss B-1 of 65% or more as determined by a measurement method defined below.

(Method for Measuring Heat Weight Loss B-1)

The method for measuring the heat weight loss B-1 includes: taking $W_1 0$ (mg) of the sizing agent in a range of 10±2 mg; heating the sizing agent from 100° C. at a rate of 5° C./min in a nitrogen stream of 200 ml (in terms of a volume at 1 atm and 25° C.)/min, using a thermogravimetric analyzer; reading the mass of the sizing agent having reached 350° C. as $W_1 2$ (mg); and calculating the heat weight loss B-1 by formula (i):

$$\text{heat weight loss } B\text{-}1(\%)=\{(W_1 0-W_1 2)/W_1 0\}\times 100 \quad \text{(i).}$$

When the heat weight loss B-1 is not less than the above lower limit value, the following advantage is obtained. In a heat treatment for impregnating the sizing agent-adhered carbon fibers with a molten matrix resin or in a heating step of heating a prepreg to a molding temperature for molding a carbon fiber-reinforced composite material from the prepreg, the gas generation caused by decomposition or volatilization of the sizing agent is almost completed before the matrix resin, which is melted and fluidized by being heated to a high temperature, proceeds to fill the gaps between the carbon fibers. This enables the production of a high-quality molded product (carbon fiber-reinforced composite material) in which voids are unlikely to remain.

For the cases in which the heat weight loss B-1 is less than the above lower limit value, the sizing agent contains a large amount of components that decrease the heat weight loss B-1. Such components that decrease the heat weight loss B-1 have a large molecular weight and increase the binding force between the filaments of the carbon fibers. Therefore, a smaller heat weight loss B-1 results in an inferior spreadability of the sizing agent-adhered carbon fibers.

The heat weight loss B-1 can be controlled by the type and amount of the components contained in the sizing agent, for example, the surfactant described below. Further, the heat weight loss B-1 can also be controlled by using the compound (1) described below in combination with the surfactant. When the compound (1) is used in combination, the heat weight loss B-1 can also be controlled by the type and amount of the compound (1).

The heat weight loss B-1 is preferably 70% or more, more preferably 80% or more, and even more preferably 90% or more. The value of the heat weight loss B-1 is preferred to be as large as possible, and is particularly preferably 100%. That is, the upper limit value of the heat weight loss B-1 is preferably 100%.

The sizing agent of the first embodiment of the present invention has a heat weight loss A-1 of 10% or less, preferably 5% or less, as determined by a measurement method defined below. The value of the heat weight loss A-1 is preferred to be as small as possible, and is particularly preferably 0%. That is, the lower limit value of the heat weight loss A-1 is preferably 0%.

(Method for Measuring Heat Weight Loss A-1)

The method for measuring the heat weight loss A-1 includes: taking $W_1 0$ (mg) of the sizing agent in a range of 10±2 mg; heating the sizing agent from 100° C. at a rate of 5° C./min in a nitrogen stream of 200 ml (in terms of a volume at 1 atm and 25° C.)/min, using a thermogravimetric analyzer; reading the mass of the sizing agent having reached 250° C. as $W_1 1$ (mg); and calculating the heat weight loss A-1 by formula (ii):

$$\text{heat weight loss } A\text{-}1(\%)=\{(W_1 0-W_1 1)/W_1 0\}\times 100 \quad \text{(ii).}$$

When the heat weight loss A-1 is not more than the above upper limit value, the volatilization and heat decomposition of the sizing agent can be suppressed in the process of applying the sizing agent to the untreated carbon fibers, during the storage of the sizing agent-adhered carbon fibers, or in the process of fiber spreading. This enables the production of sizing agent-adhered carbon fibers with less fluffing caused by mechanical friction such as in fiber spreading and with excellent handling performance.

The heat weight loss A-1 can be controlled by the type and amount of the components contained in the sizing agent, for example, the surfactant described below. Further, the heat weight loss A-1 can also be controlled by using the compound (1) described below in combination with the surfactant. When the compound (1) is used in combination, the heat weight loss A-1 can also be controlled by the type and amount of the compound (1).

The sizing agent of the first embodiment of the present invention preferably contains a surfactant.

By containing a surfactant, the sizing agent uniformly adheres to untreated carbon fibers, and the handling properties of the sizing agent-adhered carbon fibers improve. Further, with the use of a surfactant, it becomes easy to disperse the sizing agent in water.

In the present invention, the "surfactant" is a substance that lowers the surface free energy at the interface between a lipophilic liquid and water, and is generally a compound having a hydrophilic group and a hydrophobic group in one molecule.

Examples of the surfactant that can be used in the present invention include nonionic surfactants, anionic surfactants, cationic surfactants and the like. Among these, a nonionic surfactant is preferable in that, when the sizing agent is heated, the components other than the surfactant contained in the sizing agent are less likely to react with the surfactant, and the heat weight loss A-1 and the heat weight loss B-1 can be easily controlled to a desired value. If the components other than the surfactant react with the surfactant, for example, a reaction product having a crosslinked structure is produced, and it becomes difficult to control the heat weight loss B-1 to a desired value. As a result, in a heating step of heating a prepreg to a molding temperature for molding a carbon fiber-reinforced composite material from the prepreg, which is described below, the gas generation caused by decomposition or volatilization of the sizing agent continues even after the matrix resin, which is melted and fluidized by being heated to a high temperature, proceeds to fill the gaps between the carbon fibers; therefore, the effect of the present invention may not be achieved sufficiently.

Examples of the nonionic surfactant include aliphatic nonionic surfactants such as a block polymer of ethylene oxide and propylene oxide (so-called a pluronic block copolymer), an ethylene oxide adduct of a higher alcohol, an ethylene oxide adduct of a fatty acid, an ethylene oxide adduct of a fatty acid ester of a polyhydric alcohol, a fatty acid ester of a glycerol, a fatty acid ester of a sorbitol or sorbitan, and a fatty acid ester of a pentaerythritol; phenol based nonionic surfactants such as an alkylphenol based nonionic surfactant and a polycyclic phenol based nonionic surfactants. Among these, phenol based nonionic surfactants are preferable, and alkylphenol based nonionic surfactants are particularly preferable.

Any one of these nonionic surfactants may be used alone, or two or more thereof may be used in the form of a mixture with an appropriate blending ratio.

The surfactant preferably has a heat weight loss B-4 of 10% or more, more preferably 20% or more, as determined by a measurement method defined below. The value of the heat weight loss B-4 is preferred to be as large as possible, and is particularly preferably 100%. That is, the upper limit value of the heat weight loss B-4 is preferably 100%.

(Method for Measuring Heat Weight Loss B-4)

The method for measuring the heat weight loss B4 includes: taking $W_40$ (mg) of the surfactant in a range of 10±2 mg; heating the sizing agent from 100° C. at a rate of 5° C./min in a nitrogen stream of 200 ml (in terms of a volume at 1 atm and 25° C.)/min, using a thermogravimetric analyzer; reading the mass of the surfactant having reached 350° C. as $W_42$ (mg); and calculating the heat weight loss B-4 by formula (iii):

$$\text{heat weight loss } B\text{-}4(\%)=\{(W_40-W_42)/W_40\}\times 100 \quad \text{(iii).}$$

When the heat weight loss B-4 is not less than the above lower limit value, it becomes easy to control the heat weight loss B-1 of the sizing agent to a desired value.

The amount of the surfactant is preferably 5 to 25% by mass, and more preferably 10 to 18% by mass, based on the total mass of the sizing agent. When the amount of the surfactant is not less than the above lower limit value, the sizing agent is more likely to adhere uniformly to untreated carbon fibers. In addition, for dispersing the sizing agent in water, the sizing agent can be easily dispersed in water. When the amount of the surfactant is not more than the above upper limit value, the effect of the sizing agent is satisfactorily achieved. In particular, a smaller amount of the surfactant is more favorable for producing a prepreg from which a molded product (carbon fiber-reinforced composite material) with less voids can be produced.

The sizing agent of the first embodiment of the present invention may contain a component other than the surfactant. For example, the sizing agent may contain the compound (1) described below or other components.

In the measurement of the heat weight loss A-1 and the heat weight loss B-1, the heating rate for heating the sizing agent to 100° C. is preferably 5 to 20° C./min.

In the measurement of the heat weight loss B-4, the heating rate for heating the surfactant to 100° C. is preferably 5 to 20° C./min.

When the sizing agent contains a surfactant, the heat weight loss A-1 and the heat weight loss B-1 are values measured with respect to the sizing agent containing the surfactant. When the sizing agent contains the compound (1) described below in addition to the surfactant, the heat weight loss A-1 and the heat weight loss B-1 are values measured with respect to the sizing agent containing the surfactant and the compound (1). When the sizing agent contains the compound (1) and other components described below in addition to the surfactant, the heat weight loss A-1 and the heat weight loss B-1 are values measured with respect to the sizing agent containing the surfactant, the compound (1) and the other components.

Further, even the values of the heat weight loss A-2 and the heat weight loss B-2 of the sizing agent as an extract, which are measured with respect to the sizing agent extracted from the sizing agent-adhered carbon fibers described below, or the values of the heat weight loss A-3 and the heat weight loss B-3 of the sizing agent measured after removing water from the sizing agent aqueous dispersion almost coincide with the values of the heat weight loss A-1 and the heat weight loss B-1 of the sizing agent before adhered to the carbon fibers.

One example of the method for extracting the sizing agent from the sizing agent-adhered carbon fibers is a method in which the sizing agent is eluted from the sizing agent-adhered carbon fibers with an organic solvent capable of dissolving the sizing agent, and the organic solvent is removed from the obtained extraction liquid under reduced pressure. Examples of the organic solvent capable of dissolving the sizing agent include acetone, methyl ethyl ketone (MEK), tetrahydrofuran (THF), toluene, dichloromethane and the like. Among these, methyl ethyl ketone is preferable.

Second Embodiment

The sizing agent of the second embodiment of the present invention contains a surfactant and a compound (1) represented by formula (1).

By containing a surfactant, the sizing agent uniformly adheres to untreated carbon fibers, and the handling properties of the sizing agent-adhered carbon fibers improves.

Examples of the surfactant include those listed above in the description of the first embodiment. In particular, a surfactant having a heat weight loss B-4 of 10% or more is preferable, and a surfactant having a heat weight loss B-4 of 20% or more is more preferable. The value of the heat weight loss B-4 is preferred to be as large as possible, and is particularly preferably 100%. That is, the upper limit value of the heat weight loss B-4 is preferably 100%.

The amount of the surfactant is preferably 5 to 25% by mass, and more preferably 10 to 18% by mass, based on the total mass of the sizing agent. When the amount of the surfactant is not less than the above lower limit value, the sizing agent is more likely to adhere uniformly to untreated carbon fibers. When the amount of the surfactant is not more than the above upper limit value, the effect of the sizing agent is satisfactorily achieved. In particular, a smaller amount of the surfactant is more favorable for producing a prepreg from which a molded product (carbon fiber-reinforced composite material) with less voids can be produced.

When the sizing agent contains the compound (1), the volatilization and heat decomposition of the sizing agent can be suppressed in the process of applying the sizing agent to the untreated carbon fibers, during the storage of the sizing agent-adhered carbon fibers, or in the process of fiber spreading. This enables the production of sizing agent-adhered carbon fibers with less fluffing caused by mechanical friction such as fiber spreading and with excellent handling performance. Further, in a heat treatment for impregnating the sizing agent-adhered carbon fibers with a molten matrix resin or in a heating step of heating a prepreg to a molding temperature for molding a carbon fiber-reinforced composite material from the prepreg, almost the whole of the sizing agent is decomposed or volatilized and removed from the molded product before the matrix resin, which is melted and fluidized by being heated to a high temperature, proceeds to fill the gaps between the carbon fibers. This enables the production of a high-quality molded product (carbon fiber-reinforced composite material) in which voids are unlikely to remain. In addition, the handling properties of the sizing agent-adhered carbon fibers improves further.

(1)

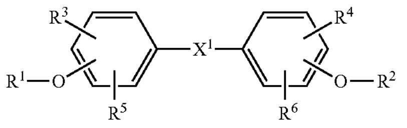

In the formula (1), $X^1$ is a direct bond or a binding group represented by formula (1'), $R^1$ and $R^2$ are each independently a hydrogen atom or a substituent having 1 to 7 carbon atoms, and $R^3$, $R^4$, $R^5$ and $R^6$ are each independently a hydrogen atom or a hydrocarbon group having 1 to 3 carbon atoms.

Examples of the substituent having 1 to 7 carbon atoms include an aliphatic hydrocarbon group having 1 to 7 carbon atoms, a glycidyl group, a hydroxyethyl group, and substituents having an oxyalkylene group. Examples of the aliphatic hydrocarbon group having 1 to 7 carbon atoms include an alkyl group having 1 to 7 carbon atoms, an alkenyl group having 1 to 7 carbon atoms, and an alkynyl group having 1 to 7 carbon atoms. Examples of the substituent having an oxyalkylene group include $-(CH_2-CH_2-O)_{m1}-H$, $-(CH_2-CH_2-CH_2-O)_{n1}-H$, $-(CH(CH_3)-CH_2-O)_{q1}-H$, $-(CH_2-CH(CH_3)-O)_{r1}-H$, $-(CH_2-CH_2-O)_{m2}-CH_3$, $-(CH_2-CH_2-CH_2-O)_{n2}-CH_3$, $-(CH(CH_3)-CH_2-O)_{q2}-CH_3$, $-(CH_2-CH(CH_3)-O)_{r2}-CH_3$, $-(CH_2-CH_2-O)_{m3}-CH_2-CH_3$, $-(CH_2-CH_2-CH_2-O)_{n3}-CH_2-CH_3$, $-(CH(CH_3)-CH_2-O)_{q3}-CH_2-CH_3$, and $-(CH_2-CH(CH_3)-O)_{r3}-CH_2-CH_3$. In the above description, m1, m2, and m3 each represents the number of repetitions of $CH_2-CH_2-O$, and an integer of 1 or more. The value of m1 is preferably 1 to 3, the value of m2 is preferably 1 to 3, and the value of m3 is preferably 1 to 2. In the above description, n1, n2, and n3 each represents the number of repetitions of $CH_2-CH_2-CH_2$-0, and an integer of 1 or more. The value of n1 is preferably 1 to 2, the value of n2 is preferably 1 to 2, and the value of n3 is preferably 1. In the above description, q1, q2, and q3 each represents the number of repetitions of $CH(CH_3)-CH_2$-0, and an integer of 1 or more. The value of q1 is preferably 1 to 2, the value of q2 is preferably 1 to 2, and the value of q3 is preferably 1. In the above description, r1, r2, and r3 each represents the number of repetitions of $CH_2-CH(CH_3)-O$, and an integer of 1 or more. The value of r1 is preferably 1 to 2, the value of r2 is preferably 1 to 2, and the value of r3 is preferably 1.

Each of $R^1$ and $R^2$ is independently preferred to be a substituent having 1 to 7 carbon atoms and having an aliphatic hydrocarbon group, a glycidyl group or an oxyalkylene group.

Each of $R^3$, $R^4$, $R^5$ and $R^6$ is independently preferred to be a methyl group or a hydrogen atom.

$X^1$ is preferably a binding group represented by the following formula (1').

(1')

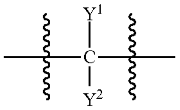

In the formula (1'), $Y^1$ and $Y^2$ are each independently a hydrogen atom or a hydrocarbon group having 1 to 3 carbon atoms, and each wavy line indicates a bonding site with an adjacent group.

Each of $Y^1$ and $Y^2$ is independently preferred to be a methyl group or a hydrogen atom.

Examples of the compound (1) include bisphenol A type epoxy resin, bisphenol F type epoxy resin, bisphenol A ethylene oxide adduct, bisphenol A propylene oxide adduct, bisphenol A dialkyl ether, and bisphenol A diallyl ether.

As a material containing the compound (1), a commercially available product can be used, and examples thereof include "jER825", "jER807", and "jER806", each manufactured by Mitsubishi Chemical Corporation; and "Newpol BPE-20" and "Newpol BP-2P", each manufactured by Sanyo Chemical Industries, Ltd.

As the compound (1), one type thereof may be used alone, or two or more types thereof may be used in the form of a mixture with an appropriate blending ratio. When two or more types of the compounds (1) are used, crystallization and subsequent precipitation of the compounds (1) from the sizing agent can be suppressed as compared to the case where one type of the compound (1) is used alone. From this viewpoint, it is preferable to use two or more types of the compounds (1).

When two or more types of the compounds (1) are used, a combination of a compound (2) represented by the following formula (2) and a compound (3) represented by the following formula (3) is particularly preferable.

(2)

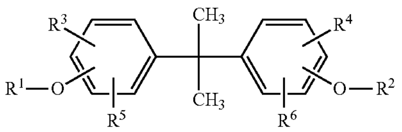

In the formula (2), $R^1$ and $R^2$ are each independently a hydrogen atom or a substituent having 1 to 7 carbon atoms, and $R^3$, $R^4$, $R^5$ and $R^6$ are each independently a hydrogen atom or a hydrocarbon group having 1 to 3 carbon atoms.

(3)

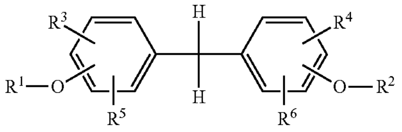

Examples of other commercially available products of a material containing the compound (1) include "jER828" manufactured by Mitsubishi Chemical Corporation and "jER1001" manufactured by Mitsubishi Chemical Corporation. These products also contain the compound (1); however, the compound (4) represented by the following formula (4) is contained in a relatively large amount, which makes it difficult to control the heat weight loss B-1 described for the first embodiment to a desired value.

On the other hand, "jER825" and "jER806", each manufactured by Mitsubishi Chemical Corporation contain the compound (4) only in a small amount. Further, the alkylene oxide adducts of bisphenol A such as "Newpol BPE-20" and "Newpol BP-2P", each manufactured by Sanyo Chemical Industries, Ltd., contain substantially no compound (4). Therefore, using "jER825" or "jER806", each manufactured by Mitsubishi Chemical Corporation, or "Newpol BPE-20" or "Newpol BP-2P", each manufactured by Sanyo Chemical Industries, Ltd., makes it easy to control the heat weight loss B-1 to a desired value.

In the present specification, for example, an expression "the component (a) contains substantially no component (P)" means that the amount of the component ((3) is less than 1% by mass, based on the total mass of the component (a).

(4)

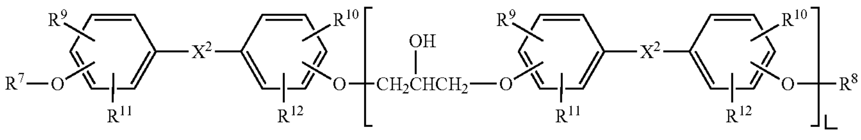

In the formula (3), $R^1$ and $R^2$ are each independently a hydrogen atom or a substituent having 1 to 7 carbon atoms, and $R^3$, $R^4$, $R^5$ and $R^6$ are each independently a hydrogen atom or a hydrocarbon group having 1 to 3 carbon atoms.

As a material containing the compound (2), a commercially available product can be used, and examples thereof include "jER825" manufactured by Mitsubishi Chemical Corporation.

As a material containing the compound (3), a commercially available product can be used, and examples thereof include "jER807" and "jER806", each manufactured by Mitsubishi Chemical Corporation.

With regard to the material containing the compound (1), when commercially available bisphenol A type epoxy resin such as "jER825" manufactured by Mitsubishi Chemical Corporation, or a bisphenol F type epoxy resin such as "jER806" manufactured by Mitsubishi Chemical Corporation, are selected, a trace amount of a compound (4) represented by the following formula (4) is contained in addition to the compound (1). The compound (4) is a component that makes it difficult to control the heat weight loss B-1 described for the first embodiment to a desired value, and as the amount of compound (4) increases, control of the heat weight loss B-1 to a desired value tends to become more difficult. That is, when the bisphenol type epoxy resin is selected as the material containing the compound (1), the amount of the compound (4) contained in the material is preferred to be small since it is easy to control the heat weight loss B-1 described for the first embodiment to a desired value.

In the formula (4), $X^2$ is a direct bond or a binding group represented by formula (4'), $R^7$ and $R^8$ are each independently a hydrogen atom or a substituent having 1 to 7 carbon atoms, $R^9$, $R^{10}$, $R^{11}$, and $R^{12}$ are each independently a hydrogen atom or a hydrocarbon group having 1 to 3 carbon atoms, and L is an integer of 1 or more.

Examples of the substituent having 1 to 7 carbon atoms include those listed above in the description of $R^1$ and $R^2$ in the formula (1).

(4')

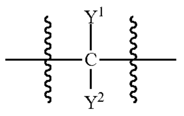

In the formula (4'), $Y^3$ and $Y^4$ are each independently a hydrogen atom or a hydrocarbon group having 1 to 3 carbon atoms, and each wavy line indicates a bonding site with an adjacent group.

The amount of the compound (4) is preferably 10 parts by mass or less, and more preferably 6 parts by mass or less, with respect to 100 parts by mass of the compound (1). It is even more preferable that the compound (1) is substantially free from the compound (4).

In this context, "substantially free" means that the amount of the compound (4) is less than 1 part by mass with respect to 100 parts by mass of the compound (1).

The amount of the compound (1) is preferably 50% by mass or more, and more preferably 70 to 95% by mass, based on the total mass of the sizing agent. When the amount of the compound (1) is not more than the above upper limit value, a sufficient amount of the surfactant can be secured, so that the sizing agent is made to adhere more uniformly to untreated carbon fibers.

When the compound (1) contains the compound (2) and the compound (3), the amount of the compound (3) is preferably 10 to 100 parts by mass, more preferably 10 to 50 parts by mass, and even more preferably 10 to 30 parts by mass, relative to 100 parts by mass of the compound (2). When the amount of the compound (3) is not less than the above lower limit value, the crystallization and subsequent precipitation of the compound (1) from the sizing agent is suppressed. When the amount of the compound (3) is not more than the above upper limit value, it becomes easy to control the heat weight loss A-1 and the heat weight loss B-1 described for the first embodiment to desired values.

The sum of the amounts of the compound (2) and the compound (3) is preferably 50% by mass or more, and more preferably 70 to 95% by mass, based on the total mass of the sizing agent. When the sum of the amounts of the compound (2) and the compound (3) is not less than the above lower limit value, it becomes easy to control the heat weight loss A-1 and the heat weight loss B-1 to desired values. When the sum of the amounts of the compound (2) and the compound (3) is not more than the above upper limit value, a sufficient amount of the surfactant can be secured, so that the sizing agent is made to adhere more uniformly to untreated carbon fibers.

The sizing agent may contain components (other components) other than the surfactant and the compound (1), if necessary, as long as the effect of the present invention is not impaired.

Examples of the other components include vinyl acetate resins, polyurethane resins, polyester resins, polyamide resins, silane coupling agents, antistatic agents, lubricants, smoothing agents and the like.

Technical Effects

The sizing agent of the first embodiment of the present invention has a heat weight loss B-1 of 65% or more. Because of this feature, in a heat treatment for impregnating the sizing agent-adhered carbon fibers with a molten matrix resin or in a heating step of heating a prepreg to a molding temperature for molding a carbon fiber-reinforced composite material from the prepreg, almost the whole of the sizing agent adhered to the carbon fibers is decomposed or volatilized and removed from the molded product before the matrix resin, which is melted and fluidized by being heated to a high temperature, proceeds to fill the gaps between the carbon fibers. This enables the production of a high-quality molded product (carbon fiber-reinforced composite material) in which voids are unlikely to remain.

When the heat weight loss A-1 of the sizing agent of the first embodiment of the present invention is 10% or less, the volatilization and heat decomposition of the sizing agent can be suppressed in the process of applying the sizing agent to the untreated carbon fibers, during the storage of the sizing agent-adhered carbon fibers, or in the process of fiber spreading. This enables the production of sizing agent-adhered carbon fibers with less fluffing caused by mechanical friction such as fiber spreading and with excellent handling performance.

Further, the presence of the surfactant in the sizing agent of the first embodiment of the present invention enables the production of sizing agent-adhered carbon fibers which are advantageous not only in that such carbon fibers are excellent in scratch resistance against mechanical friction and suffer less fluffing by mechanical friction, but also in that such carbon fibers are easy to handle in processing such as fiber spreading and weaving and suffer less fluff.

The sizing agent of the second embodiment of the present invention includes the compound (1). Because of this feature, in a heat treatment for impregnating the sizing agent-adhered carbon fibers with a molten matrix resin or in a heating step of heating a prepreg to a molding temperature for molding a carbon fiber-reinforced composite material from the prepreg, almost the whole of the sizing agent adhered to the carbon fibers is decomposed or volatilized and removed from the molded product before the matrix resin, which is melted and fluidized by being heated to a high temperature, proceeds to fill the gaps between the carbon fibers. This enables the production of a high-quality molded product (carbon fiber-reinforced composite material) in which voids are unlikely to remain. In addition, the volatilization and heat decomposition of the sizing agent can be suppressed in the process of applying the sizing agent to the untreated carbon fibers, during the storage of the sizing agent-adhered carbon fibers, or in the process of fiber spreading. This enables the production of sizing agent-adhered carbon fibers with less fluffing caused by mechanical friction such as fiber spreading and with excellent handling performance.

Further, since the sizing agent of the second embodiment of the present invention contains the surfactant, the sizing agent enables the production of sizing agent-adhered carbon fibers which are advantageous not only in that such carbon fibers are excellent in scratch resistance against mechanical friction and suffer less fluffing by mechanical friction, but also in that such carbon fibers are easy to handle in processing such as fiber spreading and weaving and suffer less fluff.

As described above, the use of the sizing agent of the first or second embodiment of the present invention enables the production of sizing agent-adhered carbon fibers showing excellent performance in respect of fiber spreading and handling, and suitable for producing a prepreg that can be used to obtain a carbon fiber-reinforced composite material with extremely small amount of voids even when a matrix resin requiring a high molding temperature such as a super engineering plastic is used.

[Sizing Agent-Adhered Carbon Fibers]

The sizing agent-adhered carbon fibers of the third embodiment of the present invention is carbon fibers having a sizing agent adhered thereto, wherein a heat weight loss B-2 is 65% or more as determined by a measurement method defined below with respect to an extract extracted from the sizing agent-adhered carbon fibers by an extraction operation defined below.

(Extraction Operation)

The extraction operation includes: a step of immersing 100 parts by mass of the sizing agent-adhered carbon fibers in 2000 parts by mass of methyl ethyl ketone, followed by performing ultrasonic cleaning at 30° C. for 30 minutes; a step of separating the carbon fibers from an extraction liquid obtained by ultrasonic cleaning by a filtration operation; repeating operations of said steps three times with respect to the separated carbon fibers; and mixing the extraction liquids obtained in respective filtration operations and depressurized to distill off the methyl ethyl ketone to obtain an extract. The extract thus obtained contains the sizing agent. For clarification, the phrase "same steps" in this context means the ultrasonic cleaning and the filtration operation.

(Method for Measuring Heat Weight Loss B-2)

The method for measuring the heat weight loss B-2 includes: taking $W_20$ (mg) of the extract in a range of 10±2 mg; heating the extract from 100° C. at a rate of 5° C./min in a nitrogen stream of 200 ml (in terms of a volume at 1 atm and 25° C.)/min, using a thermogravimetric analyzer; reading the mass of the extract having reached 350° C. as $W_22$ (mg); and calculating the heat weight loss B-2 by formula (iv):

$$\text{heat weight loss } B\text{-}2(\%)=\{(W_20-W_22)/W_20\}\times100 \quad \text{(iv)}.$$

When the heat weight loss B-2 is not less than the above lower limit value, the following advantage is obtained. In a heat treatment for impregnating the sizing agent-adhered carbon fibers with a molten matrix resin or in a heating step of heating a prepreg to a molding temperature for molding a carbon fiber-reinforced composite material from the prepreg, the gas generation caused by decomposition or volatilization of the sizing agent is almost completed before the matrix resin, which is melted and fluidized by being heated to a high temperature, proceeds to fill the gaps between the carbon fibers. This enables the production of a high-quality molded product (carbon fiber-reinforced composite material) in which voids are unlikely to remain.

When the heat weight loss B-2 is less than the above lower limit value, the sizing agent contains a large amount of components that decrease the heat weight loss B-2. Such components that decrease the heat weight loss B-2 have a large molecular weight and increase the binding force between the filaments of the carbon fibers. Therefore, a smaller heat weight loss B-2 results in an inferior spreadability of the sizing agent-adhered carbon fibers.

The heat weight loss B-2 can be controlled by the type and amount of the components contained in the sizing agent, for example, the surfactant. Further, the heat weight loss B-2 can also be controlled by using the compound (1) in combination with the surfactant. When the compound (1) is used in combination, the heat weight loss B-2 can also be controlled by the type and amount of the compound (1).

The heat weight loss B-2 is preferably 70% or more, more preferably 80% or more, and even more preferably 90% or more. The value of the heat weight loss B-2 is preferred to be as large as possible, and is particularly preferably 100%. That is, the upper limit value of the heat weight loss B-2 is preferably 100%.

The sizing agent-adhered carbon fibers of the third embodiment of the present invention preferably has a heat weight loss A-2 of 10% or less, more preferably 5% or less, as determined by a measurement method defined below with respect to an extract extracted by the extraction operation described above. The value of the heat weight loss A-2 is preferred to be as small as possible, and is particularly preferably 0%. That is, the lower limit value of the heat weight loss A-2 is preferably 0%.

(Method for Measuring Heat Weight Loss A-2)

The method for measuring the heat weight loss A-2 includes: taking $W_20$ (mg) of the extract in a range of 10±2 mg; heating the extract from 100° C. at a rate of 5° C./min in a nitrogen stream of 200 ml (in terms of a volume at 1 atm and 25° C.)/min, using a thermogravimetric analyzer; reading the mass of the extract having reached 250° C. as $W_21$ (mg); and calculating the heat weight loss A-2 by formula (v):

$$\text{heat weight loss } A\text{-}2(\%)\{(W_20-W_21)/W_20\}\times100 \quad \text{(v)}.$$

When the heat weight loss A-2 is not more than the above upper limit value, the volatilization and heat decomposition of the sizing agent can be suppressed in the process of applying the sizing agent to the untreated carbon fibers, during the storage of the sizing agent-adhered carbon fibers, or in the process of fiber spreading. This enables the production of sizing agent-adhered carbon fibers with less fluffing caused by mechanical friction such as fiber spreading and with excellent handling performance.

The heat weight loss A-2 can be controlled by the type and amount of the components contained in the sizing agent, for example, the surfactant. Further, the heat weight loss A-2 can also be controlled by using the compound (1) in combination with the surfactant. When the compound (1) is used in combination, the heat weight loss A-2 can also be controlled by the type and amount of the compound (1).

In the measurement of the heat weight loss A-2 and the heat weight loss B-2, the heating rate for heating the extract to 100° C. is preferably 5 to 20° C./min.

<Carbon Fibers>

The carbon fibers to which the sizing agent is adhered may be those obtained from any raw materials, and may be pitch-based fibers, rayon-based fibers, polyacrylonitrile-based fibers. Further, the carbon fibers may be any of a high-strength type (low elastic modulus carbon fibers), intermediate elastic modulus carbon fibers, and ultra-high elastic modulus carbon fibers.

With regard to the form of the carbon fibers, examples thereof include a form in which continuous fibers run in one direction, a form in which continuous fibers are used as weft and warp to form a woven fabric; a tow; a form in which tows run in one direction and held with weft auxiliary threads; a form in which multiple unidirectional carbon fiber sheets are stacked while varying the fiber direction of the sheets, and bound with auxiliary threads to form a multiaxial warp knit; and a non-woven fabric.

<Sizing Agent>

The sizing agent is not particularly limited, but the sizing agent of the first or second embodiment of the present invention is preferable. In particular, the sizing agent containing the surfactant is preferable, and the sizing agent containing the surfactant and the compound (1) is more preferable. When the sizing agent contains a surfactant, the sizing agent uniformly adheres to untreated carbon fibers, and the handling properties of the sizing agent-adhered carbon fibers improves.

Examples of the surfactant include those listed above in the description of the first embodiment. In particular, a surfactant having a heat weight loss B-4 of 10% or more is preferable, and a surfactant having a heat weight loss B-4 of 20% or more is more preferable. The value of the heat weight loss B-4 is preferred to be as large as possible, and is particularly preferably 100%. That is, the upper limit value of the heat weight loss B-4 is preferably 100%. When the heat weight loss B-4 is not less than the above lower limit value, it becomes easy to control the heat weight loss B-2 of the sizing agent to a desired value.

In the sizing agent-adhered carbon fibers, the amount of the adhered sizing agent is preferably 0.1 to 5% by mass, and more preferably 0.2 to 3% by mass, based on the sum of the mass of the sizing agent and the mass of the carbon fibers. When the amount of the sizing agent adhered is not less than the above lower limit value, the handling properties of the sizing agent-adhered carbon fibers improves, and fluffing occurring when processing the sizing agent-adhered carbon fibers into a prepreg or the like can be suppressed. When the amount of the sizing agent adhered is not more than the above upper limit value, a molded product (carbon fiber-reinforced composite material) having higher adhesiveness between the carbon fibers and the matrix resin can be obtained.

When the sizing agent contains a surfactant, the amount of the surfactant contained is preferably 0.001 to 0.5% by mass, and preferably 0.01 to 0.1% by mass, based on the total mass of the sizing agent and the carbon fibers. When the amount of the surfactant is not less than the above lower limit value, the sizing agent is more likely to adhere uniformly to untreated carbon fibers. In addition, for dispersing the sizing agent in water, the sizing agent can be easily dispersed in water. When the amount of the surfactant is not more than the above upper limit value, the effect of the sizing agent is satisfactorily achieved. In particular, a smaller amount of the surfactant is more favorable for producing a prepreg from which a molded product (carbon fiber-reinforced composite material) with less voids can be produced.

<Technical Effects>

The sizing agent-adhered carbon fibers of the third embodiment of the present invention have a heat weight loss B-2 of 65% or more. Because of this feature, in a heat treatment for impregnating the sizing agent-adhered carbon fibers with a molten matrix resin or in a heating step of heating a prepreg to a molding temperature for molding a carbon fiber-reinforced composite material from the prepreg, almost the whole of the sizing agent adhered to the carbon fibers is decomposed or volatilized and removed from the molded product before the matrix resin, which is melted and fluidized by being heated to a high temperature, proceeds to fill the gaps between the carbon fibers. This enables the production of a high-quality molded product (carbon fiber-reinforced composite material) in which voids are unlikely to remain.

When the heat weight loss A-2 of the sizing agent-adhered carbon fibers of the third embodiment of the present invention is 10% or less, the volatilization and heat decomposition of the sizing agent can be suppressed in the process of applying the sizing agent to the untreated carbon fibers, during the storage of the sizing agent-adhered carbon fibers, or in the process of fiber spreading. Therefore, the sizing agent-adhered carbon fibers of the third embodiment of the present invention suffer less fluffing by mechanical friction such as fiber spreading, and are excellent in handling performance.

Further, when the sizing agent adhered to the carbon fibers contain a surfactant, the presence of the surfactant enables the production of fiber substrates, such as a woven fabric and a multi-axial warp knit fabric having less fluffing, because the carbon fibers are advantageous in scratch resistance against mechanical friction and suffer less fluffing by mechanical friction, but also are easy to handle in processing such as fiber spreading and weaving.

As described above, the sizing agent-adhered carbon fibers of the third embodiment of the present invention show excellent performance in respect of fiber spreading and handling, and are suitable for producing a prepreg that can be used to obtain a carbon fiber-reinforced composite material with extremely small amount of voids even when a matrix resin requiring a high molding temperature such as a super engineering plastic is used.

<Application>

By impregnating the sizing agent-adhered carbon fibers of the third embodiment of the present invention with a matrix resin, an intermediate material such as a unidirectional prepreg, a cloth prepreg, a tow prepreg, a short fiber sheet prepreg, or a short fiber mat prepreg is formed, which can be processed into a fiber-reinforced composite material.

The method for producing the sizing agent-adhered carbon fibers will be described later.

[Sizing Agent Aqueous Dispersion]

The sizing agent aqueous dispersion of the forth embodiment of the present invention contains a sizing agent and water, and has a heat weight loss B-3 of 65% or more as determined by a measurement method defined below.

(Method for Measuring Heat Weight Loss B-3)

The method for measuring the heat weight loss B-3 includes: weighting 1 g of the sizing agent aqueous dispersion, followed by heating at 110° C. for 1 hour to remove water to recover the sizing agent; taking $W_30$ (mg) of the sizing agent in a range of 10±2 mg; heating the sizing agent from 100° C. at a rate of 5° C./min in a nitrogen stream of 200 ml (in terms of a volume at 1 atm and 25° C.)/min, using a thermogravimetric analyzer; reading the mass of the sizing agent having reached 350° C. as $W_32$ (mg); and calculating the heat weight loss B-3 by formula (vi):

$$\text{heat weight loss } B\text{-}3(\%)=\{(W_30-W_32)/W_30\}\times 100 \quad \text{(vi).}$$

When the heat weight loss B-3 is not less than the above lower limit value, the following advantage is obtained. In a heat treatment for impregnating the sizing agent-adhered carbon fibers with a molten matrix resin or in a heating step of heating a prepreg to a molding temperature for molding a carbon fiber-reinforced composite material from the prepreg, the gas generation caused by decomposition or volatilization of the sizing agent is almost completed before the matrix resin, which is melted and fluidized by being heated to a high temperature, proceeds to fill the gaps between the carbon fibers. This enables the production of a high-quality molded product (carbon fiber-reinforced composite material) in which voids are unlikely to remain.

When the heat weight loss B-3 is less than the above lower limit value, the sizing agent contains a large amount of components that decrease the heat weight loss B-3. Such components that decrease the heat weight loss B-3 have a large molecular weight and increase the binding force between the filaments of the carbon fibers. Therefore, a smaller heat weight loss B-3 results in an inferior spreadability of the sizing agent-adhered carbon fibers.

The heat weight loss B-3 can be controlled by the type and amount of the components contained in the sizing agent, for example, the surfactant. Further, the heat weight loss B-3 can also be controlled by using the compound (1) in combination with the surfactant. When the compound (1) is used in combination, the heat weight loss B-3 can also be controlled by the type and amount of the compound (1).

The heat weight loss B-3 is preferably 70% or more, more preferably 80% or more, and even more preferably 90% or more. The value of the heat weight loss B-3 is preferred to be as large as possible, and is particularly preferably 100%. That is, the upper limit value of the heat weight loss B-3 is preferably 100%.

The sizing agent aqueous dispersion of the fourth embodiment of the present invention preferably has a heat weight loss A-3 of 10% or less, more preferably 5% or less, as determined by a measurement method defined below. The value of the heat weight loss A-3 is preferred to be as small as possible, and is particularly preferably 0%. That is, the lower limit value of the heat weight loss A-3 is preferably 0%.

(Method for Measuring Heat Weight Loss A-3)

The method for measuring the heat weight loss A-3 includes: weighting 1 g of the sizing agent aqueous dispersion, followed by heating at 110° C. for 1 hour to remove water to recover the sizing agent; taking $W_30$ (mg) of the sizing agent in a range of 10±2 mg; heating the sizing agent from 100° C. at a rate of 5° C./min in a nitrogen stream of 200 ml (in terms of a volume at 1 atm and 25° C.)/min, using a thermogravimetric analyzer; reading the mass of the sizing agent having reached 250° C. as $W_31$ (mg); and calculating the heat weight loss A-3 by formula (vii):

$$\text{heat weight loss } A\text{-}3(\%)=\{(W_30-W_31)/W_30\}\times100 \quad \text{(vii).}$$

When the heat weight loss A-3 is not more than the above upper limit value, the volatilization and heat decomposition of the sizing agent can be suppressed in the process of applying the sizing agent to the untreated carbon fibers, during the storage of the sizing agent-adhered carbon fibers, or in the process of fiber spreading. This enables the production of sizing agent-adhered carbon fibers with less fluff caused by mechanical friction such as fiber spreading and with excellent handling performance.

The heat weight loss A-3 can be controlled by the type and amount of the components contained in the sizing agent, for example, the surfactant. Further, the heat weight loss A-3 can also be controlled by using the compound (1) in combination with the surfactant. When the compound (1) is used in combination, the heat weight loss A-3 can also be controlled by the type and amount of the compound (1).

In the measurement of the heat weight loss A-3 and the heat weight loss B-3, the heating rate for heating the sizing agent to 100° C. is preferably 5 to 20° C./min.

<Sizing Agent>

The sizing agent is not particularly limited, but the sizing agent of the first or second embodiment of the present invention is preferable. In particular, the sizing agent containing the surfactant is preferable, and the sizing agent containing the surfactant and the compound (1) is more preferable. When the sizing agent contains a surfactant, the sizing agent uniformly adheres to untreated carbon fibers, and the handling properties of the sizing agent-adhered carbon fibers improves.

Examples of the surfactant include those listed above in the description of the first embodiment. In particular, a surfactant having a heat weight loss B-4 of 10% or more is preferable, and a surfactant having a heat weight loss B-4 of 20% or more is more preferable. The value of the heat weight loss B-4 is preferred to be as large as possible, and is particularly preferably 100%. That is, the upper limit value of the heat weight loss B-4 is preferably 100%. When the heat weight loss B-4 is not less than the above lower limit value, it becomes easy to control the heat weight loss B-3 of the sizing agent to a desired value.

When the sizing agent contains a surfactant, the amount of the surfactant is preferably 5 to 25% by mass, and preferably 10 to 18% by mass, based on the total mass of the sizing agent. When the amount of the surfactant is not less than the above lower limit value, the sizing agent is more likely to adhere uniformly to untreated carbon fibers. In addition, for dispersing the sizing agent in water, the sizing agent can be easily dispersed in water. When the amount of the surfactant is not more than the above upper limit value, the effect of the sizing agent is satisfactorily achieved. In particular, a smaller amount of the surfactant is more favorable for producing a prepreg from which a molded product (carbon fiber-reinforced composite material) with less voids can be produced.

<Method for Producing Sizing Agent Aqueous Dispersion>

The sizing agent aqueous dispersion can be prepared by, for example, mixing a surfactant, the compound (1), and other components as necessary to prepare a sizing agent, followed by gradual addition of water while stirring the obtained sizing agent to thereby make a phase inversion emulsification proceed.

<Technical Effects>

The sizing agent aqueous dispersion of the fourth embodiment of the present invention has a heat weight loss B-3 of 65% or more. Because of this feature, in a heat treatment for impregnating the sizing agent-adhered carbon fibers with a molten matrix resin or in a heating step of heating a prepreg to a molding temperature for molding a carbon fiber-reinforced composite material from the prepreg, almost the whole of the sizing agent adhered to the carbon fibers is decomposed or volatilized and removed from the molded product before the matrix resin, which is melted and fluidized by being heated to a high temperature, proceeds to fill the gaps between the carbon fibers. This enables the production of a high-quality molded product (carbon fiber-reinforced composite material) in which voids are unlikely to remain.

When the heat weight loss A-3 of the sizing agent aqueous dispersion of the fourth embodiment of the present invention is 10% or less, the volatilization and heat decomposition of the sizing agent can be suppressed in the process of applying the sizing agent to the untreated carbon fibers, during the storage of the sizing agent-adhered carbon fibers, or in the process of fiber spreading. This enables the production of sizing agent-adhered carbon fibers with less fluffing caused by mechanical friction such as fiber spreading and with excellent handling performance.

Further, the presence of the surfactant in the sizing agent in the sizing agent aqueous dispersion enables the production of sizing agent-adhered carbon fibers which are advantageous not only in that such carbon fibers are excellent in scratch resistance against mechanical friction and suffer less fluffing by mechanical friction, but also in that such carbon fibers are easy to handle in processing such as fiber spreading and weaving and suffer less fluff.

As described above, the use of the sizing agent aqueous dispersion of the fourth embodiment of the present invention enables the production of sizing agent-adhered carbon fibers showing excellent performance in respect of fiber spreading and handling, and suitable for producing a prepreg that can be used to obtain a carbon fiber-reinforced composite material with extremely small amount of voids even when a matrix resin requiring a high molding temperature such as a super engineering plastic is used.

[Method for Producing Sizing Agent-Adhered Carbon Fibers]

The fifth embodiment of the present invention relates to a method for producing sizing agent-adhered carbon fibers, including a step of making the sizing agent adhere to untreated carbon fibers (i.e., a sizing process).

Examples of the carbon fibers include those mentioned above in the description of the third embodiment.

The sizing agent is preferably that of the first or second embodiment of the present invention. In particular, the sizing agent containing the surfactant is preferable, and the sizing agent containing the surfactant and the compound (1) is more preferable. When the sizing agent contains a surfactant, the sizing agent uniformly adheres to untreated carbon fibers, and the handling properties of the sizing agent-adhered carbon fibers improves.

Examples of the surfactant include those listed above in the description of the first embodiment. In particular, a surfactant having a heat weight loss B-4 of 10% or more is preferable, and a surfactant having a heat weight loss B-4 of 20% or more is more preferable. The value of the heat weight loss B-4 is preferred to be as large as possible, and is particularly preferably 100%. That is, the upper limit value of the heat weight loss B-4 is preferably 100%.

The method for applying the sizing agent to the surface of the carbon fibers is not particularly limited as long as a desired amount of the sizing agent can be uniformly adhered to the carbon fiber, but it is preferable to employ a method in which a dispersion of the sizing agent in a dispersion medium such as water or an organic solvent is prepared, and the dispersion of the sizing agent is applied to carbon fibers, followed by drying to remove the dispersion medium. Particularly, it is more preferable to employ a method in which an aqueous dispersion of the sizing agent, in which the sizing agent is dispersed in water, is prepared, and the aqueous dispersion of the sizing agent is applied to carbon fibers followed by drying to remove the water.

As the aqueous dispersion of the sizing agent, the sizing agent aqueous dispersion of the fourth embodiment of the present invention is preferable.

In the context of the present specification, "dispersion" means a suspension in which a sizing agent is suspended in a dispersion medium such as water or an organic solvent as particles or micelles having a size of about 1 nm to 10 μm.

Examples of the method for applying the dispersion of the sizing agent to the carbon fibers include a method of immersing carbon fibers in the dispersion of the sizing agent via a roller, and a method of contacting carbon fibers with a roller to which the dispersion of the sizing agent is attached. Of these, a method of immersing carbon fibers in the dispersion of the sizing agent via a roller is preferable.

The amount of the sizing agent adhered to the surface of the carbon fibers can be controlled by adjusting the concentration of the dispersion of the sizing agent and adjusting the degree of squeezing the carbon fibers.

The drying can be performed using hot air, a hot plate, a heating roller, various infrared heaters, and the like. The temperature during the drying is preferably 110 to 200° C., and more preferably 120 to 170° C., for preventing weight loss or thermal decomposition of the components contained in the sizing agent due to heat during the drying, while efficiently performing the drying. For the same reason, the drying time is preferably 5 seconds or more and 10 minutes or less, and more preferably 10 seconds or more and 5 minutes or less.

<Technical Effects>

According to the method of the fifth embodiment of the present invention, the sizing agent-adhered carbon fibers of the third embodiment of the present invention can be easily produced.

[Prepreg]

The prepreg of the sixth embodiment of the present invention includes the sizing agent of the first or second embodiment described above, carbon fibers, and a matrix resin. Specifically, in the prepreg, the sizing agent-adhered carbon fibers are impregnated with the matrix resin.

In the prepreg of the sixth embodiment of the present invention, the degree of impregnation with the matrix resin may be a complete impregnation without leaving any voids, or a partial impregnation with the matrix resin. For improving the drape of the prepreg, it is preferable that the prepreg is partially impregnated with the matrix resin.

The sizing agent is that of the first or second embodiment of the present invention; therefore, description on the sizing agent is omitted.

Examples of the carbon fibers include those mentioned above in the description of the third embodiment.

<Matrix Resin>

The matrix resin is not particularly limited, and examples thereof include thermosetting resins such as an epoxy resin, a radical polymerization resin (an acrylic resin, a vinyl ester resin, an unsaturated polyester resin, etc.), and a phenol resin; and thermoplastic resins such as polyolefin, polyester, polyamide, polyimide, polyamideimide, polyetherimide, polyetherketone, polyetherketoneketone, polyetheretherketone, polyphenylene sulfide, and polyethersulfone. Among these, thermoplastic resins are preferable because the effect of the present invention is shown more prominently. Particularly preferable examples thereof include polyimide, polyamideimide, polyetherimide, polyetherketone, polyetherketoneketone, polyetheretheretherketone, polyphenylene sulfide and polyethersulfone, which require high molding temperatures.

One of these matrix resins may be used alone, or two or more of them may be used in the form of a mixture thereof with an appropriate blending ratio.

The glass transition temperature of the thermoplastic resin is preferably 50° C. or higher, more preferably 100° C. or higher, and even more preferably 150° C. or higher. When the glass transition temperature of the thermoplastic resin is not lower than the above lower limit value, the effect of the present invention is shown more prominently.

The glass transition temperature of the thermoplastic resin is a value measured according to JIS K7121 using a differential scanning calorimeter (DSC).

<Technical Effects>

When the prepreg of the sixth embodiment of the present invention is used, in a heating step of heating the prepreg to a molding temperature for molding a carbon fiber-reinforced composite material, almost the whole of the sizing agent is decomposed or volatilized and removed from the molded product before the matrix resin is melted and fluidized and proceeds to fill the gaps between the carbon fibers. This enables the production of a high-quality molded product (carbon fiber-reinforced composite material) in which voids are unlikely to occur.

<Application>

The prepreg of the sixth embodiment of the present invention can be molded by a known molding method to provide a molded product (hereinafter, also referred to as "carbon fiber-reinforced composite material") having a desired shape. That is, the carbon fiber-reinforced composite material is a molded product of the prepregs of the sixth embodiment of the present invention.

[Method for Producing a Prepreg]

The seventh embodiment of the present invention relates to a method for producing a prepreg, including a step of impregnating the sizing agent-adhered carbon fibers of the third embodiment with a matrix resin.

Examples of the matrix resin include those listed above in the description of the sixth embodiment of the present invention.

Examples of the method for impregnating the sizing agent-adhered carbon fibers with the matrix resin include a method in which the matrix resin is dissolved in a solvent, and the sizing agent-adhered carbon fibers are impregnated with the solution followed by removing the solvent, and a method in which the matrix resin is melted, and the sizing agent-adhered carbon fibers are impregnated with the molten matrix resin.

In the case of the method in which the matrix resin is dissolved in a solvent, and the sizing agent-adhered carbon fibers are impregnated with the solution, followed by removing the solvent, the method for removing the solvent may be, for example, a method of evaporating the solvent by reducing the pressure, a method of evaporating the solvent by heating, or a method of removing the solvent by heating while reducing the pressure.

With regard to the method in which the matrix resin is melted, and the sizing agent-adhered carbon fibers are impregnated with the molten matrix resin, specific examples thereof include: a method in which a molten matrix resin is applied to the sizing agent-adhered carbon fibers, and the resulting is pressurized to impregnate the carbon fibers with the matrix resin; a method in which the sizing agent-adhered carbon fibers are combined with a film-shaped matrix resin, and the resulting is pressurized while heating, thereby melting the film-shaped matrix resin by heating while making the molten matrix resin impregnate the sizing agent-adhered carbon fibers by pressurization; a method in which a fibrous matrix resin is mixed with the sizing agent-adhered carbon fibers, and the resulting is pressurized while heating, thereby melting the fibrous matrix resin by heating while making the molten matrix resin impregnate the sizing agent-adhered carbon fibers by pressurization; and a method in which a powdery matrix resin is introduced into a bundle of the sizing agent-adhered carbon fibers, and the resulting is pressurized while heating, thereby melting the powdery matrix resin by heating while making the molten matrix resin impregnate the sizing agent-adhered carbon fibers by pressurization.

In the case of a method in which a molten matrix resin is applied to the sizing agent-adhered carbon fibers, and the resulting is pressurized to impregnate the carbon fibers with the matrix resin, or a method in which the sizing agent-adhered carbon fibers are combined with a film-shaped matrix resin, and the resulting is pressurized while heating, thereby melting the film-shaped matrix resin by heating while making the molten matrix resin impregnate the sizing agent-adhered carbon fibers by pressurization, it is preferable that an operation of fiber spreading of the sizing agent-adhered carbon fibers is implemented prior to the impregnation with the matrix resin for better impregnation results. In this context, "fiber spreading" means a step of increasing the width of a bundle of carbon fibers by a method such as rubbing against a solid surface, exposure to an air flow, or contact with a vibrating solid.

A particularly preferable impregnation method is one in which spread sizing agent-adhered carbon fibers are arranged in a sheet form, and sandwiched between two film-shaped matrix resins, followed by pressurization while heating to thereby melt the film-shaped matrix resin by heating while making the molten matrix resin impregnate the sizing agent-adhered carbon fibers by pressurization.

The heating temperature for melting the matrix resin to impregnate the sizing agent-adhered carbon fibers is not particularly limited as long as the matrix resin can be melted, but is preferably 100 to 400° C., and more preferably 200 to 400° C. The heating time is preferably 10 seconds or more and 10 minutes or less.

In the prepreg production method of the seventh embodiment of the present invention, when the carbon fibers are impregnated with a molten matrix resin, the sizing agent of the first or second embodiment of the present invention may be, in some cases, decomposed or volatilized. As a result of the heat treatment for impregnating the sizing agent-adhered carbon fibers with the molten matrix resin during the production of the prepreg, at least a part of the sizing agent may be decomposed or volatilized, or the sizing agent may remain in the prepreg without being decomposed or volatilized.

<Technical Effects>

According to the method of the seventh embodiment of the present invention, the prepreg of the sixth embodiment of the present invention can be easily produced.

[Method for Producing Carbon Fiber-Reinforced Composite Material]

The eighth embodiment of the present invention relates to a method for producing a carbon fiber-reinforced composite material, including producing prepregs by the method of the seventh embodiment of the present invention, and molding the obtained prepregs.

In the context of the present specification, the process of molding prepregs to produce a molded product (carbon fiber-reinforced composite material) is referred to as a molding step. The molding step includes a sub-step of laminating two or more prepregs along a molding die to form a laminate (lamination sub-step), a sub-step of heating the laminate of prepregs to a molding temperature under pressure (heating sub-step), and a sub-step of lowering the temperature to room temperature (25° C.) (cooling sub-step). Further, the molding step may include a sub-step of holding the molding temperature constant (holding sub-step) between the heating sub-step and the cooling sub-step, if necessary.

For laminating the prepregs in the lamination sub-step, the required number of prepregs may be laminated according to the intended use of the carbon fiber-reinforced composite material.

Further, the molding temperature in the present specification means the highest temperature in the heating operation in the molding step.

For example, in the case of a molding step where a laminate of prepregs is heated to 380° C. at 10° C./min under pressure, kept at 380° C. for 30 minutes, and then cooled to room temperature, the molding temperature is 380° C.

In the molding step, a known molding method using a molding die can be adopted, and examples thereof include autoclave molding, oven molding, internal pressure molding, and press molding. Among these, autoclave molding is preferable in that a carbon fiber-reinforced composite material of a higher quality can be easily obtained.

The molding temperature is not particularly limited as long as the matrix resin is melted and the carbon fiber-reinforced composite material can be obtained, but is preferably 350° C. or higher. The molding temperature is preferably 420° C. or lower.

Further, if necessary, the heating rate for raising the temperature to the molding temperature may be controlled, or the molding temperature may be maintained. The heating rate is preferably 1 to 20° C./min. The time for maintaining at the molding temperature is preferably 1 to 240 minutes.

<Technical Effects>

According to the carbon fiber-reinforced composite material production method of the eighth embodiment of the present invention, the sizing agent in the prepregs is decomposed or volatilized during the process of heating the laminate of prepregs to the molding temperature; however, almost the whole of the sizing agent is decomposed or volatilized and removed from the molded product (carbon fiber-reinforced composite material) before the matrix resin is melted and fluidized and proceeds to fill the gaps between the carbon fibers, whereby voids are unlikely to remain in the molded product.

Therefore, the carbon fiber-reinforced composite material production method of the eighth embodiment of the present invention enables the production of a carbon fiber-reinforced composite material with extremely small amount of voids even when the prepregs contain a sizing agent.

EXAMPLES

Hereinbelow, the present invention will be specifically described in more detail by way of Examples which should not be construed as limiting the present invention.

Various measurement/evaluation methods performed in the Examples and the Comparative Examples, and raw materials used in the Examples and the Comparative Examples are as described below.

[Measurement and Evaluation Methods]

(Measurement of Heat Weight Loss B-1 and Heat Weight Loss A-1)

$W_1 0$ (mg) of the sizing agent was taken in a range of 10±2 mg, and heated to 100° C. at 20° C./min in a nitrogen stream of 200 ml (in terms of volume at 1 atm and 25° C.)/min, using a thermogravimetric analyzer ("TG/DTA 6200" manufactured by Hitachi High-Tech Science Corporation). Then, the temperature was raised from 100° C. to 350° C. at 5° C./min to obtain a heat weight loss curve, and the mass $W_1 1$ (mg) of the sizing agent having reached 250° C. and the mass $W_1 2$ (mg) of the sizing agent having reached 350° C. were determined. Using the determined values, the heat weight loss B-1 was calculated by the following formula (i) and the heat weight loss A-1 was calculated by the following formula (ii).

$$\text{Heat weight loss } B\text{-}1(\%)=\{(W_1 0-W_1 2)/W_1 0\}\times 100 \quad \text{(i)}$$

$$\text{Heat weight loss } A\text{-}1(\%)=\{(W_1 0-W_1 i)/W_1 0\}\times 100 \quad \text{(ii)}$$

The sizing agent used for measuring the heat weight loss was a product obtained by mixing the raw materials for the sizing agent of each example described below, followed by heating to 80° C. and stirring continued until a homogeneous mixture was obtained. In the case of a single raw material being used, the heat weight loss of such a raw material as such was measured.

(Measurement of Heat Weight Loss B-2 and Heat Weight Loss A-2)

100 parts by mass of the sizing agent-adhered carbon fibers were immersed in 2000 parts by mass of methyl ethyl ketone, followed by performing ultrasonic cleaning at 30° C. for 30 minutes. The carbon fibers were separated from an extraction liquid obtained by ultrasonic cleaning by a filtration operation. The above operations were repeated three times with respect to the separated carbon fibers. The extraction liquids obtained in the respective filtration operations were mixed and depressurized to distill off the methyl ethyl ketone to obtain an extract.

$W_2 0$ (mg) of the obtained extract was taken in a range of 10±2 mg, and heated to 100° C. at 20° C./min in a nitrogen stream of 200 ml (in terms of volume at 1 atm and 25° C.)/min, using a thermogravimetric analyzer ("TG/DTA 6200" manufactured by Hitachi High-Tech Science Corporation). Then, the temperature was raised from 100° C. to 350° C. at 5° C./min to obtain a heat weight loss curve, and the mass $W_2 1$ (mg) of the extract having reached 250° C. and the mass $W_2 2$ (mg) of the extract having reached 350° C. were determined. Using the determined values, the heat weight loss B-2 was calculated by the following formula (iv) and the heat weight loss A-2 was calculated by the following formula (v).

$$\text{Heat weight loss } B\text{-}2(\%)=\{(W_2 0-W_2 2)/W_2 0\}\times 100 \quad \text{(iv)}$$

$$\text{Heat weight loss } A\text{-}2(\%)=\{(W_2 0-W_2 1)/W_2 0\}\times 100 \quad \text{(v)}$$

(Measurement of Heat Weight Loss B-3 and Heat Weight Loss A-3)

1 g of the sizing agent aqueous dispersion was weighed, and heated at 110° C. for 1 hour to remove water to recover the sizing agent. $W_3 0$ (mg) of the sizing agent was taken in a range of 10±2 mg, and heated to 100° C. at 20° C./min in a nitrogen stream of 200 ml (in terms of volume at 1 atm and 25° C.)/min, using a thermogravimetric analyzer ("TG/DTA 6200" manufactured by Hitachi High-Tech Science Corporation). Then, the temperature was raised from 100° C. to 350° C. at 5° C./min to obtain a heat weight loss curve, and the mass $W_3 1$ (mg) of the sizing agent having reached 250° C. and the mass $W_3 2$ (mg) of the sizing agent having reached 350° C. were determined. Using the determined values, the heat weight loss B-3 was calculated by the following formula (vi) and the heat weight loss A-3 was calculated by the following formula (vii).

$$\text{Heat weight loss } B\text{-}3(\%)=\{(W_3 0-W_3 2)/W_3 0\}\times 100 \quad \text{(vi)}$$

$$\text{Heat weight loss } A\text{-}3(\%)=\{(W_3 0-W_3 1)/W_3 0\}\times 100 \quad \text{(vii)}$$

In the case of Comparative Example 6, instead of the sizing agent aqueous dispersion, a solution in which the sizing agent was dissolved in methyl ethyl ketone was used, and this solution was heated at 110° C. for 1 hour to remove the methyl ethyl ketone and to recover the sizing agent.

(Measurement of Heat Weight Loss B-4)

$W_4 0$ (mg) of the surfactant was taken in a range of 10±2 mg, and heated to 100° C. at 20° C./min in a nitrogen stream of 200 ml (in terms of volume at 1 atm and 25° C.)/min, using a thermogravimetric analyzer ("TG/DTA 6200" manufactured by Hitachi High-Tech Science Corporation). Then, the temperature was raised from 100° C. to 350° C. at 5° C./min to obtain the mass $W_4 2$ (mg) of the surfactant having reached 350° C. Using the obtained value, the heat weight loss B-4 was calculated by the following formula (iii).

$$\text{Heat weight loss } B\text{-}4(\%)=\{(W_4 0-W_4 2)/W_4 0\}\times 100 \quad \text{(iii)}$$

(Measurement of Amount of Sizing Agent Adhered to Carbon Fibers)

With respect to the sizing agent-adhered carbon fibers, the mass of the sizing agent per absolute dry mass of the carbon fibers with the sizing agent adhered thereto was measured according to the procedure 2 of the solvent extraction method of the method A of JIS R 7604: 1999. Methyl ethyl ketone was used as a solvent for extracting the sizing agent.

(Evaluation of Spreadability)

The fiber spreading of the sizing agent-adhered carbon fibers during the production of a unidirectional prepreg using the sizing agent-adhered carbon fibers was visually observed, and was evaluated according to the following evaluation criteria.

- I: The sizing agent-adhered carbon fibers had excellent spreadability: carbon fibers were arranged without gaps.
- II: The sizing agent-adhered carbon fibers had poor spreadability: gaps were observed between carbon fibers.

(Evaluation of Handling Performance)

The occurrence of fluff at the time of unwinding the sizing agent-adhered carbon fibers from a bobbin was visually observed, and the handling performance was evaluated according to the following evaluation criteria.

- I: No fluffing was observed while the sizing agent-adhered carbon fibers were unwound from the bobbin immediately after wound around the bobbin, as well as while the sizing agent-adhered carbon fibers were unwound from the bobbin after being left wound around the bobbin for one month.

II: No fluff was observed while the sizing agent-adhered carbon fibers were unwound from the bobbin immediately after wound around the bobbin; however, many occurrences of fluff were observed while the sizing agent-adhered carbon fibers were unwound from the bobbin after being left wound around the bobbin for one month, and the production of a prepreg using the unwound carbon fibers was difficult.

III: Many occurrences of fluff were observed while the sizing agent-adhered carbon fibers were unwound from the bobbin immediately after wound around the bobbin, and the production of a prepreg using the unwound carbon fibers was difficult.

(Evaluation of Molded Plate)

A 20 mm×20 mm test piece was cut out from a molded plate, the cross section of the test piece was mirror-polished, the cross section was observed with an optical microscope, and the condition of the molded plate was evaluated according to the following evaluation criteria.

I: No voids were found on the molded plate.

II: Small amount of voids were found on the molded plate.

III: Many voids were found on the molded plate.

[Raw Materials]

Table 1 shows the raw materials used in the Examples and Comparative Examples. Table 2 shows the heat weight loss B-4 values of the surfactants used in the Examples and Comparative Examples.

TABLE 1

| Product name | Name of substance | Supplier | Amount of compound (1) [% by mass] | Amount of compound (4) [% by mass] |
|---|---|---|---|---|
| jER1001 | Bisphenol A type epoxy resin | Mitsubishi Chemical Corporation | 12 | 88 |
| jER828 | Bisphenol A type epoxy resin | Mitsubishi Chemical Corporation | 82 | 18 |
| jER825 | Bisphenol A type epoxy resin | Mitsubishi Chemical Corporation | 95 | 5 |
| jER807 | Bisphenol F type epoxy resin | Mitsubishi Chemical Corporation | 82 | 18 |
| jER806 | Bisphenol F type epoxy resin | Mitsubishi Chemical Corporation | 88 | 12 |
| YED122 | o-sec-Butylphenyl(glycidyl) ether | Mitsubishi Chemical Corporation | Substantially none | Substantially none |
| Denacol EX-521 | Polyglycerol polyglycidyl ether | Nagase ChemteX Corporation | Substantially none | Substantially none |
| Newpol BP-2P | Bisphenol A propylene oxide adduct | Sanyo Chemical Industries, Ltd. | 100 | Substantially none |
| Newpol BPE-20 | Bisphenol A ethylene oxide adduct | Sanyo Chemical Industries, Ltd. | 100 | Substantially none |
| Newcol CMP-11 | Polyoxyethylene p-cumyl phenyl ether (nonionic surfactant) | Nippon Nyukazai Co., LTd. | Substantially none | Substantially none |
| HITENOL NF-17 | Polyoxyethylene polycyclic phenyl ether ammonium sulfate (anionic surfactant) | DKS Co. Ltd. | Substantially none | Substantially none |
| EMULGEN 120 | Polyoxyethylene lauryl ether (nonionic surfactant) | Kao Corporation | Substantially none | Substantially none |
| NOIGEN EA-137 | Polyethylene alkyl phenyl ether (nonionic surfactant) | DKS Co. Ltd. | Substantially none | Substantially none |

TABLE 2

| Surfactant | Heat weight loss B-4 [%] |
|---|---|
| Newcol CMP-11 | 24.8 |
| HITENOL NF-17 | 45.5 |
| EMULGEN 120 | 27.9 |
| NOIGEN EA-137 | 7.7 |

The "amount of compound (1)" in Table 1 is the amount (% by mass) of the compound (1) contained in the raw material, based on the total mass of the raw materials. The "amount of compound (4)" is the amount (parts by mass) of the compound (4) with respect to 100 parts by mass of the compound (1) contained in the raw materials. "Substantially free" means that the amount of the compound (1) or the compound (4) is less than 1% by mass, based on the total mass of the raw materials.

"JER1001", "jER828", "jER825", "Newpol BPE-20" and "Newpol BP-2P" are materials containing the compound (2) and not containing the compound (3).

"JER807" and "jER806" are materials containing the compound (2) and the compound (3).

"YED122" and "Denacol EX-521" are materials that do not contain the compound (1).

Example 1

(Preparation of Sizing Agent Aqueous Dispersion)

The raw materials shown in Table 1 were mixed according to the compounding ratio (parts by mass) shown in Table 3, heated to 80° C., and stirred until the resulting mixture became homogeneous, and a sizing agent was obtained thereby.

An ion-exchanged water was added to the sizing agent while stirring, and phase inversion emulsification was implemented using a homomixer to obtain a sizing agent aqueous dispersion, in which the sizing agent was dispersed in water. The amount of the ion-exchanged water added to the sizing agent was adjusted so as to adjust the concentration of the sizing agent in the sizing agent aqueous dispersion to 30% by mass.

The heat weight loss A-1 and the heat weight loss B-1 of the sizing agent, and the heat weight loss A-3 and the heat weight loss B-3 of the sizing agent aqueous dispersion were measured. The results are shown in Table 3.

(Production of Sizing Agent-Adhered Carbon Fibers)

Carbon fibers without sizing agent ("Pyrofil MR 60H24P", manufactured by Mitsubishi Chemical Corporation, number of filaments: 24,000, fiber diameter: 5 μm) were immersed in and passed through an immersion tank filled with the aqueous dispersion of the sizing agent. Then, the carbon fibers were dried by contact with a roller heated to 150° C. for 20 seconds to obtain a sizing agent-adhered carbon fibers. In this process, the concentration of the sizing agent in the aqueous dispersion in the immersion tank was adjusted so as to control the amount of the sizing agent adhered to the carbon fibers to 0.4% by mass.

The obtained sizing agent-adhered carbon fibers were wound around a bobbin.

The heat weight loss A-2 and the heat weight loss B-2 of the sizing agent-adhered carbon fibers were measured. The results are shown in Table 3.

Since there was no difference in the values between the heat weight loss A-1, the heat weight loss A-2 and the heat weight loss A-3, these values are collectively described as "heat weight loss A" in Tables 3 and 4 showing the results of the Examples and the Comparative Examples. Similarly, since there was no difference in the values between the heat weight loss B-1, the heat weight loss B-2 and the heat weight loss B-3, these values are collectively described as "heat weight loss B" in Tables 3 and 4 showing the results of the Examples and the Comparative Examples.

(Production of Unidirectional Prepreg)

The obtained sizing agent-adhered carbon fibers were unwound from the bobbin, and aligned while spreading the fibers so as to arrange the fibers at a constant pitch into a sheet form. The resulting was sandwiched between PEEK films having a thickness of 15 μm from above and below, and pressurized at 1.0 MPa for 2 minutes while heating at 370° C. to obtain a unidirectional prepreg. The carbon fiber basis weight of the unidirectional prepreg was 80 $g/m^2$, and the resin content thereof was 33%.

The fiber spreadability and handling properties of the sizing agent-adhered carbon fibers in the production process of the unidirectional prepreg were evaluated. The results are shown in Table 3.

(Production of Molded Plate)

The obtained unidirectional prepreg was cut into sheets of 200 mm×200 mm, and the thus obtained 40 sheets were laminated such that the fiber directions of the sheets were the same with each other. The resulting laminate was pressurized at 1.5 MPa in a nitrogen atmosphere in an autoclave, and heated from 30° C. to the molding temperature of 400° C. at 10° C./min. The temperature was held at 400° C. for 60 minutes and lowered to room temperature while maintaining the pressure to obtain a molded plate (carbon fiber-reinforced composite material).

The condition of the obtained molded plate was evaluated. The results are shown in Table 3.

Examples 2 to 6, 8, 9, Comparative Examples 1 to 5

Sizing agent aqueous dispersions were prepared in the same manner as in Example 1 except that the raw materials shown in Table 1 were mixed according to the compounding ratios (parts by mass) shown in Tables 3 and 4 to prepare sizing agents. Using the obtained sizing agent aqueous dispersions, sizing agent-adhered carbon fibers, unidirectional prepregs and molded plates were produced, and various measurements and evaluations thereon were performed in the same manner as in Example 1. The results are shown in Tables 3 and 4.

Example 7

A sizing agent aqueous dispersion was prepared in the same manner as in Example 1 except that the raw materials shown in Table 1 were mixed according to the compounding ratio (parts by mass) shown in Table 3 to prepare sizing agent. Using the obtained sizing agent aqueous dispersion, sizing agent-adhered carbon fibers were produced in the same manner as in Example 1 except that the time for allowing the carbon fibers to contact the roller heated to 150° C. was changed to 5 seconds. Using the obtained sizing agent-adhered carbon fibers, a unidirectional prepreg and a molded plate were produced, and various measurements and evaluations thereon were performed in the same manner as in Example 1. The results are shown in Table 3.

Comparative Example 6

The raw materials shown in Table 1 were mixed according to the compounding ratio (parts by mass) shown in Table 4 to thereby obtain a sizing agent.

Sizing agent-adhered carbon fibers were produced in the same manner as in Example 1 except that a solution in which the sizing agent was dissolved in methyl ethyl ketone was used instead of the sizing agent aqueous dispersion, and the drying was carried out in a nitrogen atmosphere having a temperature of 100° C. instead of contact with a roller heated to 150° C. for 20 seconds. Using the obtained sizing agent-adhered carbon fibers, a unidirectional prepreg and a molded plate were produced, and various measurements and evaluations thereon were performed in the same manner as in Example 1. The results are shown in Table 4.

Comparative Example 7

The raw materials shown in Table 1 were mixed according to the compounding ratio (parts by mass) shown in Table 4, and the resulting was dissolved in water to thereby obtain a sizing agent aqueous solution.

Sizing agent-adhered carbon fibers were produced in the same manner as in Example 1 except that the sizing agent aqueous solution was used instead of the sizing agent aqueous dispersion. Using the obtained sizing agent-adhered carbon fibers, a unidirectional prepreg and a molded plate were produced, and various measurements and evaluations thereon were performed in the same manner as in Example 1. The results are shown in Table 4.

TABLE 3

| | | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|
| Blending ratio [parts by mass] | jER825 | 85 | 75 | 75 | 80 | 0 | 0 | 0 | 85 | 85 |
| | jER807 | 0 | 10 | 0 | 0 | 0 | 0 | 0 | 0 | 0 |
| | jER806 | 0 | 0 | 10 | 0 | 0 | 0 | 0 | 0 | 0 |
| | YED122 | 0 | 0 | 0 | 0 | 0 | 0 | 85 | 0 | 0 |
| | Newpol BP-2P | 0 | 0 | 0 | 0 | 90 | 0 | 0 | 0 | 0 |
| | Newpol BPE-20 | 0 | 0 | 0 | 0 | 0 | 90 | 0 | 0 | 0 |
| | Newcol CMP-11 | 15 | 15 | 15 | 20 | 10 | 10 | 15 | 0 | 0 |
| | EMULGEN 120 | 0 | 0 | 0 | 0 | 0 | 0 | 0 | 15 | 0 |
| | NOIGEN EA-137 | 0 | 0 | 0 | 0 | 0 | 0 | 0 | 0 | 15 |
| Amount of compound (1) in sizing agent [% by mass] | | 80.8 | 79.5 | 80.1 | 76.0 | 90.0 | 90.0 | 0 | 80.8 | 80.8 |
| Amount of compound (2) + compound (3) in sizing agent [% by mass] | | 80.8 | 79.5 | 80.1 | 76.0 | 90.0 | 90.0 | 0 | 80.8 | 80.8 |
| Amount [parts by mass] of compound (3) per 100 parts by mass of compound (2) | | 0 | 11.5 | 12.4 | 0 | 0 | 0 | 0 | 0 | 0 |
| Heat weight loss A [%] | | 1.0 | 1.2 | 1.2 | 1.0 | 1.8 | 2.1 | 99.2 | 1.1 | 0.8 |
| Heat weight loss B [%] | | 72.0 | 71.1 | 71.5 | 68.9 | 76.8 | 72.8 | 99.4 | 72.5 | 69.2 |
| Evaluation | Fiber spreadability | I | I | I | I | I | I | I | I | I |
| | Handling | I | I | I | I | I | I | II | I | I |
| | Condition of molded plate | I | I | I | II | I | I | I | I | II |

TABLE 4

| | | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|
| Blending ratio [parts by mass] | jER1001 | 0 | 0 | 42.5 | 0 | 0 | 0 | 0 |
| | jER825 | 0 | 0 | 0 | 70 | 85 | 100 | 0 |
| | jER828 | 85 | 75 | 42.5 | 0 | 0 | 0 | 0 |
| | jER807 | 0 | 10 | 0 | 0 | 0 | 0 | 0 |
| | Denacol EX-521 | 0 | 0 | 0 | 0 | 0 | 0 | 100 |
| | Newcol CMP-11 | 15 | 15 | 15 | 30 | 0 | 0 | 0 |
| | HITENOL NF-17 | 0 | 0 | 0 | 0 | 15 | 0 | 0 |
| Amount of compound (1) in sizing agent [% by mass] | | 69.7 | 69.7 | 40.0 | 66.5 | 80.8 | 95.0 | 0 |
| Amount of compound (2) + compound (3) in sizing agent [% by mass] | | 69.7 | 69.7 | 40.0 | 66.5 | 80.8 | 95.0 | 0 |
| Amount [parts by mass] of compound (3) per 100 parts by mass of compound (2) | | 0 | 13.3 | 0 | 0 | 0 | 0 | 0 |

TABLE 4-continued

| | | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|
| Heat weight loss A [%] | | 1.0 | 1.3 | 1.0 | 1.0 | 6.7 | 1.0 | 2.7 |
| Heat weight loss B [%] | | 62.7 | 62.9 | 15.4 | 62.8 | 19.3 | 86.2 | 40.1 |
| Evaluation | Fiber spreadability | I | I | II | I | I | I | I |
| | Handling | I | I | I | I | I | III | I |
| | Condition of molded plate | III | III | III | III | III | — | III |

As is clear from the results shown in Table 3, the sizing agent-adhered carbon fibers obtained in Examples 1 to 3, 5, 6 and 8 were excellent in fiber spreading and handling performance, and all of the molded plates obtained from those sizing agent-adhered carbon fibers had no voids and were of high quality.

The sizing agent-adhered carbon fibers obtained in Examples 4 and 9 were excellent in fiber spreading and handling performance, but a small amount of voids were observed in the molded plates obtained from the sizing agent-adhered carbon fibers.

The sizing agent-adhered carbon fibers obtained in Example 7 were excellent in fiber spreadability, and the molded plate obtained from the sizing agent-adhered carbon fibers had no voids and was of high quality. However, with regard to handling properties, fluffing was observed while the carbon fibers were unwound from the bobbin after the one-month storage. This is presumably because the sizing agent volatilized during the storage, resulting in lowering of handling properties.

On the other hand, as is clear from the results shown in Table 4, the sizing agent-adhered carbon fibers obtained in Comparative Examples 1, 2, 4, 5 and 7 were excellent in fiber spreading and handling performance; however, many voids occurred in the molded plates obtained from those sizing agent-adhered carbon fibers, and the quality of the molded plates was not satisfactory.

The sizing agent-adhered carbon fibers obtained in Comparative Example 3 had poor fiber spreadability, and many voids occurred in the molded plate obtained from the sizing agent-adhered carbon fibers, and the quality of the molded plate was not satisfactory.

The sizing agent-adhered carbon fibers obtained in Comparative Example 6 had poor handling properties, and it was difficult to produce a unidirectional prepreg. Therefore, no test on the molded plate could be done.

INDUSTRIAL APPLICABILITY

The sizing agent-adhered carbon fibers of the present invention show excellent performance in respect of fiber spreading and handling performance, and are suitable for producing a prepreg that can be used to obtain a carbon fiber-reinforced composite material with extremely small amount of voids. The prepreg of the present invention is useful as an intermediate material for a carbon fiber-reinforced composite material with extremely small amount of voids.

The invention claimed is:

1. A sizing agent, comprising 5 to 25% by mass a surfactant, based on a total mass of the sizing agent, wherein the sizing agent has a heat weight loss B-1 of 65% or more as determined by a measurement method defined below, wherein the measurement method for the heat weight loss B-1 comprises: taking $W_10$ (mg) of the sizing agent in a range of 10±2 mg; heating the sizing agent from 100° C. at a rate of 5° C./min in a nitrogen stream of 200 mL (in terms of a volume at 1 atm and 25° C.)/min, using a thermogravimetric analyzer; reading the mass of the sizing agent having reached 350° C. as $W_12$ (mg); and calculating the heat weight loss B-1 by formula (i):

$$\text{heat weight loss } B\text{-}1(\%)=\{(W_10-W_12)/W_10\}\times100 \quad \text{(i), and}$$

the surfactant has a heat weight loss B-4 of 10% or more, as determined by a measurement method defined below, wherein the measurement method for the heat weight loss B-4 comprises: taking $W_40$ (mg) of the surfactant in a range of 10±2 ma; heating the surfactant from 100° C. at a rate of 5° C./min in a nitrogen stream of 200 mL (in terms of a volume at 1 atm and 25° C.)/min, using a thermogravimetric analyzer; reading the mass of the surfactant having reached 350° C. as $W_42$ (mg); and calculating the heat weight loss B-4 by formula (iii):

$$\text{heat weight loss } B\text{-}4(\%)=\{W_40-W_42)/W_40\}\times100 \quad \text{(iii).}$$

2. The sizing agent of claim 1, which has a heat weight loss A-1 of 10% or less as determined by a measurement method defined below, wherein the measurement method for the heat weight loss A-1 comprises: taking $W_10$ (mg) of the sizing agent in a range of 10±2 mg; heating the sizing agent from 100° C. at a rate of 5° C./min in a nitrogen stream of 200 mL (in terms of a volume at 1 atm and 25° C.)/min, using a thermogravimetric analyzer; reading the mass of the sizing agent having reached 250° C. as $W_11$ (mg); and calculating the heat weight loss A-1 by formula (ii):

$$\text{heat weight loss } A\text{-}1(\%)=\{(W_10-W_11)/W_10\}\times100 \quad \text{(ii).}$$

3. The sizing agent of claim 1, further comprising:

a compound (1) of formula (1):

(1)

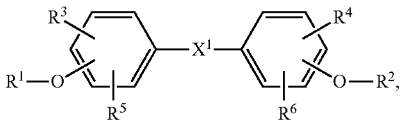

$X^1$ being a direct bond or a binding group of formula (1'):

(1')

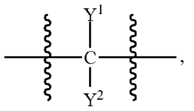

$R^1$ and $R^2$ independently being H or a substituent comprising 1 to 7 carbon atoms, and $R^3$, $R^4$, $R^5$, and $R^6$ independently being H or a hydrocarbon group comprising 1 to 3 carbon atoms, $Y^1$ and $Y^2$ independently being H or a hydrocarbon group comprising 1 to 3 carbon atoms, and each wavy line indicating a bonding site with an adjacent group.

4. The sizing agent of claim 3, wherein the compound (1) is present in 50% by mass or more, based on a total mass of the sizing agent.

5. The sizing agent of claim 3, wherein the compound (1) comprises;

a compound (2) of formula (2):

(2)

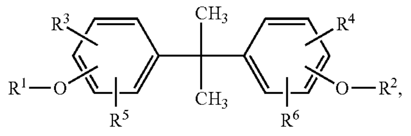

$R^1$ and $R^2$ independently being H or a substituent comprising 1 to 7 carbon atoms, and $R^3$, $R^4$, $R^5$, and $R^6$ independently being H or a hydrocarbon group comprising 1 to 3 carbon atoms; and a compound (3) of formula (3):

(3)

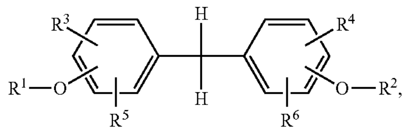

$R^1$ and $R^2$ independently being H or a substituent comprising 1 to 7 carbon atoms, and $R^3$, $R^4$, $R^5$ and $R^6$ independently being H or a hydrocarbon group comprising 1 to 3 carbon atoms.

6. The sizing agent of claim 5, wherein an amount of the compound (3) in the sizing agent is in a range of from 10 to 100 parts by mass, relative to 100 parts by mass of the compound (2).

7. The sizing agent of claim 5, wherein a sum of amounts of the compound (2) and the compound (3) contained in the sizing agent is 50% by mass or more, based on a total mass of the sizing agent.

8. Sizing agent-adhered carbon fibers, comprising:

a sizing agent adhered to carbon fibers, wherein the sizing agent comprises 5 to 25% by mass a surfactant, based on a total mass of the sizing agent, a heat weight loss B-2 is 65% or more, as determined by a measurement method defined below with respect to an extract extracted from the sizing agent-adhered carbon fibers by an extraction operation defined below, wherein the extraction operation comprises: immersing 100 parts by mass of the sizing agent-adhered carbon fibers in 2000 parts by mass of methyl ethyl ketone, followed by performing ultrasonic cleaning at 30° C. for 30 minutes; separating the carbon fibers from an extraction liquid obtained by ultrasonic cleaning by a filtration operation; repeating operations of the immersing and separating three times with respect to the separated carbon fibers; and mixing the extraction liquids obtained in respective filtration operations and depressurized to distill off the methyl ethyl ketone to obtain an extract, wherein the measurement method for the heat weight loss B-2 comprises: taking $W_20$ (mg) of the extract in a range of 10±2 mg; heating the extract from 100° C. at a rate of 5° C./min in a nitrogen stream of 200 mL (in terms of a volume at 1 atm and 25° C.)/min, using a thermogravimetric analyzer; reading the mass of the extract having reached 350° C. as $W_22$ (mg); and calculating the heat weight loss B-2 by formula (iv):

$$\text{heat weight loss } B\text{-}2(\%)=\{(W_20-W_22)/W_20\}\times 100 \quad \text{(iv), and}$$

the surfactant has a heat weight loss B-4 of 10% or more, as determined by a measurement method defined below, wherein the measurement method for the heat weight loss B-4 comprises: taking $W_40$ (mg) of the surfactant in a range of 10±2 mg; heating the surfactant from 100° C. at a rate of 5° C./min in a nitrogen stream of 200 mL (in terms of a volume at 1 atm and 25° C.)/min, using a thermogravimetric analyzer: reading the mass of the surfactant having reached 350° C. as $W_42$ (mg); and calculating the heat weight loss B-4 by formula (iii):

$$\text{heat weight loss } B\text{-}4(\%)=\{(W_40-W_42)/W_40\}\times 100 \quad \text{(iii).}$$

9. The fibers of claim 8, wherein the extract has a heat weight loss A-2 of 10% or less, as determined by a measurement method defined below, wherein the measurement method for the heat weight loss A-2 comprises: taking $W_20$ (mg) of the extract in a range of 10±2 mg; heating the extract from 100° C. at a rate of 5° C./min in a nitrogen stream of 200 mL (in terms of a volume at 1 atm and 25° C.)/min, using a thermogravimetric analyzer; reading the mass of the extract having reached 250° C. as $W_21$ (mg); and calculating the heat weight loss A-2 by formula (v):

$$\text{heat weight loss } A\text{-}2(\%)=\{(W_20-W_21)/W_20\}\times 100 \quad \text{(v).}$$

10. The fibers of claim 8, wherein the surfactant is present in a range of from 0.001 to 0.5% by mass, based on a sum of a mass of the sizing agent and a mass of the carbon fibers.

11. The fibers of claim 8, wherein an amount of adhered sizing agent is in a range of from 0.1 to 5% by mass, based on a sum of a mass of the sizing agent and a mass of the carbon fibers.

12. A sizing agent aqueous dispersion, comprising:

a sizing agent comprising 5 to 25% by mass a surfactant, based on a total mass of the sizing agent; and water, wherein the sizing agent aqueous dispersion has a heat weight loss B-3 of 65% or more as determined by a measurement method defined below, wherein the measurement method for the heat weight loss B-3 comprises: weighting 1 g of the sizing agent aqueous dispersion, followed by heating at 110° C. for 1 hour to remove water to recover the sizing agent; taking $W_30$ (mg) of the sizing agent in a range of 10±2 mg; heating the sizing agent from 100° C. at a rate of 5° C./min in a nitrogen stream of 200 mL (in terms of a volume at 1 atm and 25° C.)/min, using a thermogravimetric analyzer; reading the mass of the sizing agent having reached 350° C. as $W_32$ (mg); and calculating the heat weight loss B-3 by formula (vi):

$$\text{heat weight loss } B\text{-}3(\%)=\{(W_30-W_32)/W_30\}\times100 \quad \text{(vi), and}$$

the surfactant has a heat weight loss B-4 of 10% or more, as determined by a measurement method defined below, wherein the measurement method for the heat weight loss B-4 comprises: taking $W_40$ (mg) of the surfactant in a range of 10±2 mg; heating the surfactant from 100° C. at a rate of 5° C./min in a nitrogen stream of 200 mL (in terms of a volume at 1 atm and 25° C.)/min, using a thermogravimetric analyzer: reading the mass of the surfactant having reached 350° C. as $W_42$ (mg); and calculating the heat weight loss B-4 by formula (iii):

$$\text{heat weight loss } B\text{-}4(\%)=\{(W_40-W_42)/W_40\}\times100 \quad \text{(iii).}$$

13. The dispersion of claim 12, having a heat weight loss A-3 of 10% or less, as determined by a measurement method defined below, wherein the measurement method for the heat weight loss A-3 comprises: weighting 1 g of the sizing agent aqueous dispersion, followed by heating at 110° C. for 1 hour to remove water to recover the sizing agent; taking $W_30$ (mg) of the sizing agent in a range of 10±2 mg; heating the sizing agent from 100° C. at a rate of 5° C./min in a nitrogen stream of 200 mL (in terms of a volume at 1 atm and 25° C.)/min, using a thermogravimetric analyzer; reading the mass of the sizing agent having reached 250° C. as $W_31$ (mg); and calculating the heat weight loss A-3 by formula (vii):

$$\text{heat weight loss } A\text{-}3(\%)=\{(W_30-W_31)/W_30\}\times100 \quad \text{(vii).}$$

14. A method for producing sizing agent-adhered carbon fibers, the method comprising:

applying the sizing agent aqueous dispersion of claim 12 to carbon fibers; and removing water therefrom to make the sizing agent adhere to the carbon fibers.

15. The method of claim 14, wherein the sizing agent aqueous dispersion is applied to the carbon fibers by immersing the carbon fibers in the sizing agent aqueous dispersion.

16. A prepreg, comprising:

the sizing agent of claim 1;

carbon fibers; and a matrix resin, wherein the matrix resin is a thermoplastic resin, and wherein a glass transition temperature of the thermoplastic resin is 50° C. or higher.

17. The prepreg of claim 16, wherein the thermoplastic resin comprises polyimide, polyamideimide, polyetherimide, polyetherketone, polyetherketoneketone, polyetheretherketone, polyphenylene sulfide, and/or polyethersulfone.

18. A prepreg, comprising:

the sizing agent of claim 3;

carbon fibers; and a matrix resin, wherein the matrix resin is a thermoplastic resin, and wherein a glass transition temperature of the thermoplastic resin is 50° C. or higher.

19. The prepreg of claim 18, wherein the thermoplastic resin comprises polyimide, polyamideimide, polyetherimide, polyetherketone, polyetherketoneketone, polyetheretherketone, polyphenylene sulfide, and/or polyethersulfone.

20. A method for producing a prepreg, the method comprising:

impregnating the sizing agent-adhered carbon fibers of claim 8 with a matrix resin.

21. The method of claim 20, wherein the sizing agent-adhered carbon fibers are impregnated with the matrix resin by heating the matrix resin to a temperature in a range of from 100 to 400° C.

22. A method for producing a carbon fiber-reinforced composite material, the method comprising:

producing a prepreg by the method of claim 20;

laminating two or more sheets of the obtained prepregs to obtain a laminate; and heating the laminate to 350° C. or higher to mold the laminate.

23. A sizing agent, having a heat weight loss B-1 of 65% or more as determined by a measurement method defined below, wherein the sizing agent comprises a compound (1) of formula (1):

(1)

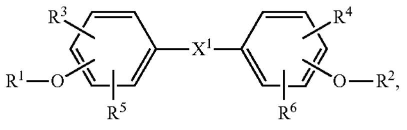

$X^1$ being a direct bond or a binding group of formula (1'), (1')

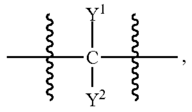

$R^1$ and $R^2$ independently being H or a substituent comprising 1 to 7 carbon atoms, and $R^3$, $R^4$, $R^5$ and $R^6$ independently being H or a hydrocarbon group comprising 1 to 3 carbon atoms, $Y^1$ and $Y^2$ independently being H or a hydrocarbon group comprising 1 to 3 carbon atoms, and each wavy line indicating a bonding site with an adjacent group, and the measurement method for the heat weight loss B-1 comprises: taking $W_10$ (mg) of the sizing agent in a range of 10±2 mg; heating the sizing agent from 100° C. at a rate of 5° C./min in a nitrogen stream of 200 mL (in terms of a volume at 1 atm and 25° C.)/min, using a thermogravimetric analyzer; reading a mass of the sizing agent having reached 350° C. as $W_12$ (mg); and calculating the heat weight loss B-1 by formula (i):

$$\text{heat weight loss } B\text{-}1(\%)=\{(W_10-W_12)/W_10\}\times100 \quad \text{(i).}$$

24. Sizing agent-adhered carbon fibers, comprising:

a sizing agent adhered to carbon fibers, wherein the sizing agent comprises a compound (1) of formula (1):

(1)

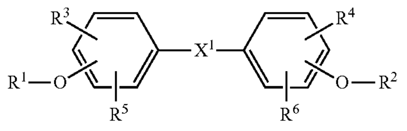

$X^1$ being a direct bond or a binding group of formula (1'), (1')

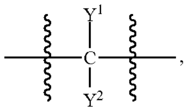

$R^1$ and $R^2$ independently being H or a substituent comprising 1 to 7 carbon atoms, and $R^3$, $R^4$, $R^5$ and $R^6$ independently being H or a hydrocarbon group comprising 1 to 3 carbon atoms, $Y^1$ and $Y^2$ independently being H or a hydrocarbon group comprising 1 to 3 carbon atoms, and each wavy line indicating a bonding site with an adjacent group, and a heat weight loss B-2 is 65% or more as determined by a measurement method defined below with respect to an extract extracted from the sizing agent-adhered carbon fibers by an extraction operation defined below, wherein the extraction operation comprises: immersing 100 parts by mass of the sizing agent-adhered carbon fibers in 2000 parts by mass of methyl ethyl ketone, followed by performing ultrasonic cleaning at 30° C. for 30 minutes; separating the carbon fibers from an extraction liquid obtained by ultrasonic cleaning by a filtration operation; repeating operations of the immersing and separating three times with respect to the separated carbon fibers; and mixing the extraction liquids obtained in respective filtration operations and depressurized to distill off the methyl ethyl ketone to obtain an extract, wherein the measurement method for the heat weight loss B-2 comprises: taking $W_20$ (mg) of the extract in a range of 10 f 2 mg; heating the extract from 100° C. at a rate of 5° C./min in a nitrogen stream of 200 mL (in terms of a volume at 1 atm and 25° C.)/min, using a thermogravimetric analyzer; reading the mass of the extract having reached 350° C. as $W_22$ (mg); and calculating the heat weight loss B-2 by formula (iv):

$$\text{heat weight loss } B\text{-}2(\%)=\{(W_20-W_22)/W_20\}\times 100 \quad \text{(iv)}.$$

* * * * *